(12) United States Patent
Kim et al.

(10) Patent No.: US 9,736,710 B2
(45) Date of Patent: Aug. 15, 2017

(54) MOBILE ACCELERATOR

(71) Applicant: Neumob, Inc., Milpitas, CA (US)

(72) Inventors: Jeff Sesung Kim, Milpitas, CA (US); Jun Ho Choi, Mountain View, CA (US)

(73) Assignee: Neumob, Inc., Milpitas, CA (US)

( * ) Notice: Subject to any disclaimer, the term of this patent is extended or adjusted under 35 U.S.C. 154(b) by 153 days.

(21) Appl. No.: 14/644,116

(22) Filed: Mar. 10, 2015

(65) Prior Publication Data
US 2016/0269927 A1    Sep. 15, 2016

(51) Int. Cl.
| | |
|---|---|
| H04W 24/08 | (2009.01) |
| H04L 12/727 | (2013.01) |
| H04L 12/733 | (2013.01) |
| H04L 12/725 | (2013.01) |
| H04W 76/02 | (2009.01) |
| H04L 29/06 | (2006.01) |
| H04W 40/20 | (2009.01) |

(52) U.S. Cl.
CPC .......... *H04W 24/08* (2013.01); *H04L 45/121* (2013.01); *H04L 45/122* (2013.01); *H04L 45/306* (2013.01); *H04L 63/168* (2013.01); *H04W 40/20* (2013.01); *H04W 76/022* (2013.01)

(58) Field of Classification Search
None
See application file for complete search history.

(56) References Cited

U.S. PATENT DOCUMENTS

| | | | | |
|---|---|---|---|---|
| 8,472,324 | B1* | 6/2013 | Richardson | H04L 45/42 370/235 |
| 8,751,613 | B1* | 6/2014 | Medved | H04L 45/00 370/229 |
| 8,819,187 | B1* | 8/2014 | Hofmann | H04L 67/2814 709/217 |
| 2001/0055285 | A1 | 12/2001 | Tomoike | |
| 2002/0009079 | A1* | 1/2002 | Jungck | H04L 29/12066 370/389 |
| 2004/0122907 | A1* | 6/2004 | Chou | H04L 63/0281 709/207 |
| 2009/0228603 | A1* | 9/2009 | Ritzau | H04L 67/288 709/238 |
| 2016/0094621 | A1* | 3/2016 | Wolfe | H04L 67/288 709/203 |

* cited by examiner

*Primary Examiner* — Brian Roberts
(74) *Attorney, Agent, or Firm* — Fenwick & West LLP

(57) ABSTRACT

Techniques for providing mobile device content delivery acceleration are discussed herein. Some embodiments may provide for a system including a mobile device and a mobile accelerator system. The mobile accelerator system may include point of presences ("POPs") configured to facilitate accelerated content delivery to the mobile device from a content server. For example, the mobile device may be configured to: determine an entry POP from POPs of a mobile accelerator system; and create a dedicated transport channel with the entry POP. The entry POP of the mobile accelerator system may be configured to: receive a query to a content server from the mobile device via the dedicated transport channel; determine at least a portion a dynamic path between the mobile device and the content server; and route data transfers between the mobile device and the content server through the at least a portion of the dynamic path.

34 Claims, 14 Drawing Sheets

| EnP | Synthetic Latency | TTL |
|---|---|---|
| SFO (San Francisco) | 80 | 200 |
| NRT (Tokyo) | 140 | 200 |
| LHR (London) | 180 | 200 |

| Protocol | FQDN | EnP | ExP | Synthetic Latency | TTL |
|---|---|---|---|---|---|
| HTTP | www.foo.com | (DIRECT) | | 100 | 200 |
| HTTP | www.foo.com | SFO | (DIRECT) | 80 | 200 |
| HTTP | www.foo.com | SFO | NRT | 50 | 200 |
| HTTP | www.foo.com | SFO | LHR | 150 | 200 |

| Protocol | FQDN | EnP | ExP | Synthetic Latency | TTL |
|---|---|---|---|---|---|
| HTTP | www.foo.com | (DIRECT) | | -1 | 200 |
| HTTP | www.foo.com | SFO | (DIRECT) | -1 | 200 |
| HTTP | www.foo.com | SFO | NRT | -1 | 200 |
| HTTP | www.foo.com | SFO | LHR | 150 | 200 |

MOBILE ACCELERATOR

FIELD

Embodiments of the invention relate, generally, to networked content delivery for mobile devices.

BACKGROUND

Technologies such as Wi-Fi or mobile broadband (e.g., 2G/3G/long-term evolution (LTE), etc.) allow mobile devices, such as cellphones or smartphones, to connect with remote content servers via the Internet. The speed of content delivery can affect the quality of data access and mobile device performance. For example, fast internet browsing, high quality video or audio data streaming, or multiplayer gaming may require data transfer rates that are faster than the capacities of conventional mobile data networks. Virtually any mobile device application supported by Internet connectivity is enhanced with faster data transfer rates. In this regard, improvements to networked content delivery for mobile devices are desirable.

BRIEF SUMMARY

Through applied effort, ingenuity, and innovation, solutions to improve such mobile devices have been realized and are described herein. Some embodiments may provide for a system including a mobile device and a mobile accelerator system. The mobile accelerator system may include multiple, interconnected point of presences (POPs). The mobile device may be configured to: determine an entry POP from the POPs of the mobile accelerator system; and create a dedicated transport channel with the entry POP. The entry POP, as well one or more (e.g., all) of the other POPS, may be configured to: receive a query to a content server from the mobile device via the dedicated transport channel; determine at least a portion a dynamic path between the mobile device and the content server; and route data transfers between the mobile device and the content server through the at least a portion of the dynamic path.

In some embodiments, the entry POP configured to determine the at least a portion of the dynamic path may include the entry POP being configured to: determine a direct connection score for a direct connection between the mobile device and the content server without traversing the mobile accelerator system; determine a POP connection score for a connection between the mobile device and the content server through the entry POP and a candidate exit POP of the plurality of POPs; determine a dynamic path ranking based on the direct connection score, the POP connection score, and one or more other POP connection scores associated with one or more other candidate exit POPs of the mobile accelerator system; and determine the at least a portion of the dynamic path based on the dynamic path ranking.

In some embodiments, the entry POP configured to determine the direct connection score may include the entry POP being configured to determine a synthetic latency between the mobile device and the content server without traversing the mobile accelerator system.

In some embodiments, the entry POP configured to determine the POP connection score may include the entry POP being configured to determine a synthetic latency between the entry POP and the content server without traversing a next POP of the mobile accelerator system.

In some embodiments, the entry POP configured to determine the POP connection score may include the entry POP being configured to determine a POP-to-POP score based on a synthetic latency between the entry POP and the candidate exit POP.

In some embodiments, the entry POP configured to determine the POP connection score may include the entry POP being configured to determine an exit POP score based on a synthetic latency between an exit POP of the mobile accelerator system and the content server.

In some embodiments, the entry POP configured to route the data transfers through the at least a portion of the dynamic path may include the entry POP being configured to route the data transfers through an exit POP of the mobile accelerator system.

In some embodiments, the entry POP configured to route the data transfers through the at least a portion of the dynamic path may include the entry POP being configured to route the data transfers through the entry POP as a single entry/exit POP.

In some embodiments, at least one of the mobile device or the entry POP may be further configured to: determine a static path between the mobile device and a second content server via a static POP of the mobile accelerator system; and route the data transfers between the mobile device and the second content server through the static POP.

In some embodiments, the mobile device configured to determine the entry POP may include the mobile device being configured to determine an entry POP score for the entry POP based on a synthetic latency between the mobile device and entry POP.

In some embodiments, the entry POP configured to determine the at least a portion of the dynamic path may include the entry POP being configured to determine a POP-to-POP score between the entry POP and an exit POP based on a synthetic latency between the entry POP and the exit POP.

In some embodiments, at least one of the mobile device and the entry POP may be further configured to optimize the dedicated transport channel based on one or more of: data encryption; data compression; transmission control protocol (TCP) optimization; hypertext transfer protocol (HTTP) optimization; user datagram protocol (UDP) optimization; transport layer security (TLS) optimization; connection pooling; or HTTP keep-alive. The entry POP may be further configured to optimize the at least a portion of the dynamic path between the entry POP and an exit POP of the mobile accelerator system based on one or more of: data encryption; data compression; transmission control protocol (TCP) optimization; hypertext transfer protocol (HTTP) optimization; user datagram protocol (UDP) optimization; or transport layer security (TLS) optimization; connection pooling; or HTTP keep-alive.

In some embodiments, the mobile device may be further configured to generate the query to the content server in connection with executing an application. In some embodiments, the entry POP is a second mobile device.

In some embodiments, the entry POP configured to determine the at least a portion the dynamic path between the mobile device and the content server may include the entry POP being configured to: determine that a first path to the content server is unavailable; and in response to determining that the first path is unavailable, determine the at least a portion the dynamic path as a second path through at least one POP of the mobile accelerator system from which the content server is available.

In some embodiments, the entry POP configured to determine the at least a portion the dynamic path between the mobile device and the content server may include the entry POP being configured to determine a second POP from the POPs of the mobile accelerator system. The entry POP configured to route data transfers between the mobile device and the content server through the at least a portion the dynamic path may include the entry POP being configured to route the data transfers to the second POP. The system further may include the second POP configured to route the data transfers to at least one of a third POP of the mobile accelerator system or the content server.

Some embodiments may include a method of providing mobile device content delivery acceleration. The method may include: determining, by a mobile device, an entry POP from POPs of a mobile accelerator system; creating, by the mobile device, a dedicated transport channel with the entry POP; receiving, by the entry POP, a query to the content server from the mobile device via the dedicated transport channel; determining, by the entry POP, at least a portion of a dynamic path between the mobile device and the content server; and routing, by the entry POP, data transfers between the mobile device and the content server through the at least a portion of the dynamic path.

In some embodiments, determining the at least a portion of the dynamic path may include: determining a direct connection score for a direct connection to between the mobile device and the content server without traversing the mobile accelerator system; determining a POP connection score for a connection between the mobile device and the content server through the entry POP and a candidate exit POP of the plurality of POPs; determining a dynamic path ranking based on the direct connection score, the POP connection score, and one or more other POP connection scores associated with one or more other candidate exit POPs of the mobile accelerator system; and determining the at least a portion of the dynamic path based on the dynamic path ranking.

In some embodiments, determining the direct connection score includes determining a synthetic latency between the mobile device and the content server without traversing the mobile accelerator system.

In some embodiments, determining the POP connection score includes determining a synthetic latency between the entry POP and the content server without traversing a next POP of the mobile accelerator system.

In some embodiments, determining the POP connection score includes determining a POP-to-POP score based on a synthetic latency between the entry POP and the candidate exit POP.

In some embodiments, determining the POP connection score includes determining an exit POP score based on a synthetic latency between an exit POP of the mobile accelerator system and the content server.

In some embodiments, routing the data transfers through the at least a portion of the dynamic path includes routing the data transfers through an exit POP of the mobile accelerator system.

In some embodiments, routing the data transfers through the at least a portion of the dynamic path includes routing the data transfers through the entry POP as a single entry/exit POP.

In some embodiments, the method may further include, by at least one of the mobile device or the entry POP: determining a static path between the mobile device and a second content server via a static POP of the mobile accelerator system; and routing second data transfers between the mobile device and the second content server through the static POP.

In some embodiments, the determining the entry POP includes determining an entry POP score for the entry POP based on a synthetic latency between the mobile device and entry POP.

In some embodiments, the method may further include optimizing, by at least one of the mobile device and the entry POP, the dedicated transport channel based on one or more of: data encryption; data compression; transmission control protocol (TCP) optimization; hypertext transfer protocol (HTTP) optimization; user datagram protocol (UDP) optimization; transport layer security (TLS) optimization; connection pooling; or HTTP keep-alive. The method may further include optimizing, by the entry POP, the at least a portion of the dynamic path between the entry POP and an exit POP of the mobile accelerator system based on one or more of: data encryption; data compression; transmission control protocol (TCP) optimization; hypertext transfer protocol (HTTP) optimization; user datagram protocol (UDP) optimization; transport layer security (TLS) optimization; connection pooling; or HTTP keep-alive.

In some embodiments, determining the at least a portion of the dynamic path includes determining a POP-to-POP score between the entry POP and an exit POP based on a synthetic latency between the entry POP and the exit POP.

In some embodiments, the method may further include generating, by the mobile device, the query to the content sever in connection with executing an application.

In some embodiments, determining the at least a portion the dynamic path between the mobile device and the content server may include: determining that a first path to the content server is unavailable; and in response to determining that the first path is unavailable, determining the at least a portion the dynamic path as a second path through at least one POP of the mobile accelerator system from which the content server is available.

In some embodiments, determining the at least a portion the dynamic path between the mobile device and the content server may include determining a second POP from the POPs of the mobile accelerator system. Routing data transfers between the mobile device and the content server through the at least a portion the dynamic path may include routing the data transfers to the second POP. The method further may include routing, by the second POP, the data transfers to at least one of a third POP of the mobile accelerator system or the content server.

In some embodiments, the entry POP may be a second mobile device.

Some embodiments may provide for a mobile device. The mobile device may include processing circuitry configured to: determine an entry POP from POPs of a mobile accelerator system; determine a query to a content server; determine at least a portion a dynamic path to the content server, wherein the portion of the dynamic path includes either (a) the entry POP or (b) a direct connection to the content server without including the POPS of the mobile accelerator system; and route data transfers between the mobile device and the content server through the at least a portion of the dynamic path.

In some embodiments, the processing circuitry configured to determine the query to the content server may include the processing circuitry being configured to receive the query from at least one of a second mobile device or a second POP of the mobile accelerator system.

In some embodiments, the processing circuitry configured to determine the query to the content server may include the processing circuitry being configured to receive the query from an application executing on the mobile device.

In some embodiments, the entry POP of the mobile accelerator system may be a second mobile device.

In some embodiments, the processing circuitry configured to determine the at least a portion the dynamic path to the content server that includes either (a) the entry POP or (b) a direct connection to the content server without including the POPS of the mobile accelerator system may include the processing circuitry being configured to: determine a first synthetic latency between the mobile device and the content server via the entry POP; determine a second synthetic latency between the mobile device and the content server via the direct connection; and determine the at least a portion the dynamic path based at least in part on the first synthetic latency and the second synthetic latency.

Some embodiments may provide for a mobile accelerator system. The mobile accelerator system may include multiple POPs. Each POP may be configured to: establish a dedicated transport channel with a mobile device; receive a query to a content server from the mobile device via the dedicated transport channel; determine at least a portion a dynamic path between the mobile device and the content server; and route data transfers between the mobile device and the content server through the at least a portion of the dynamic path. The dynamic path may include one or more POPs of the mobile accelerator system.

These characteristics as well as additional features, functions, and details of various embodiments are described below. Similarly, corresponding and additional embodiments are also described below.

BRIEF DESCRIPTION OF THE DRAWINGS

Figure 1:
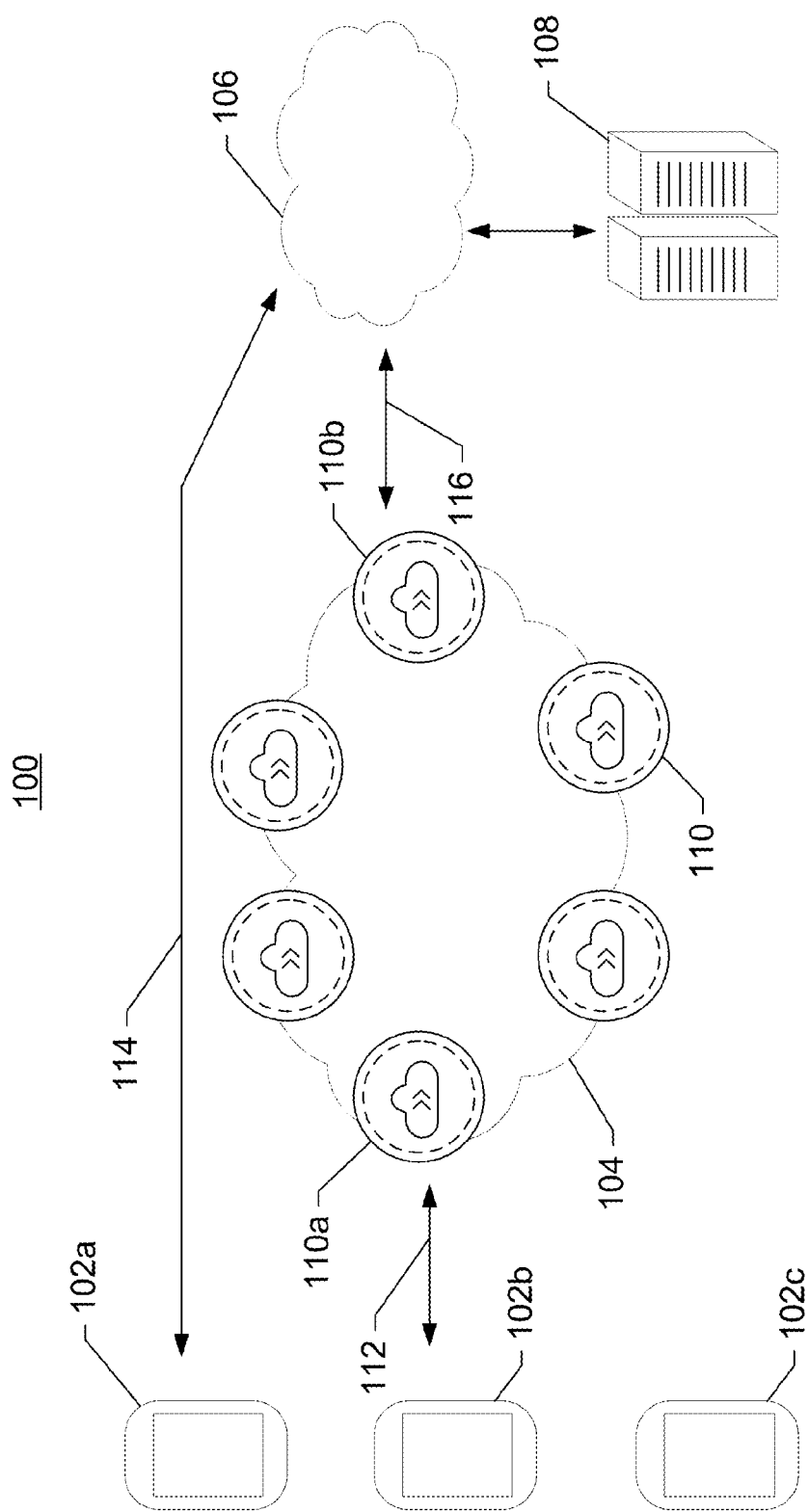
Figure 2:
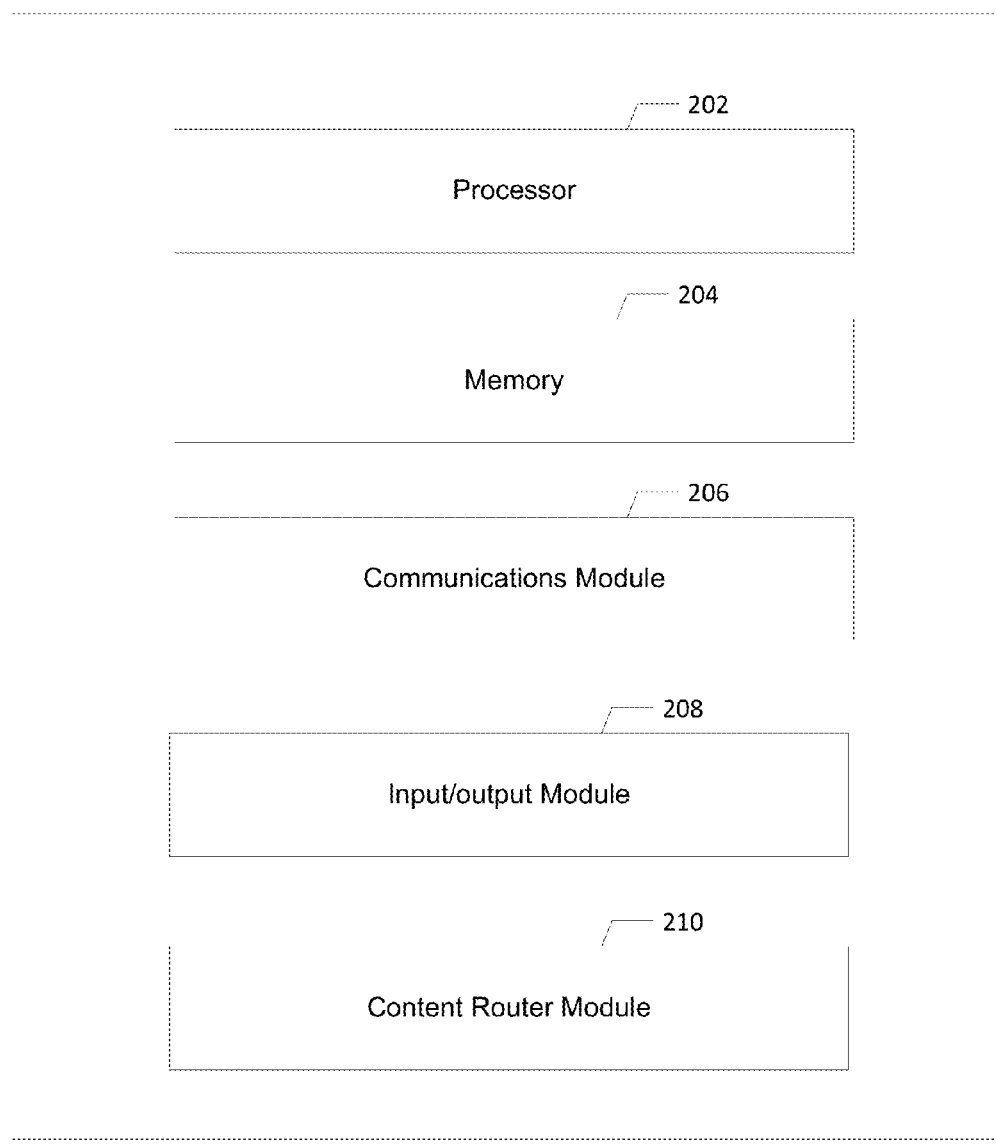
Figure 3:
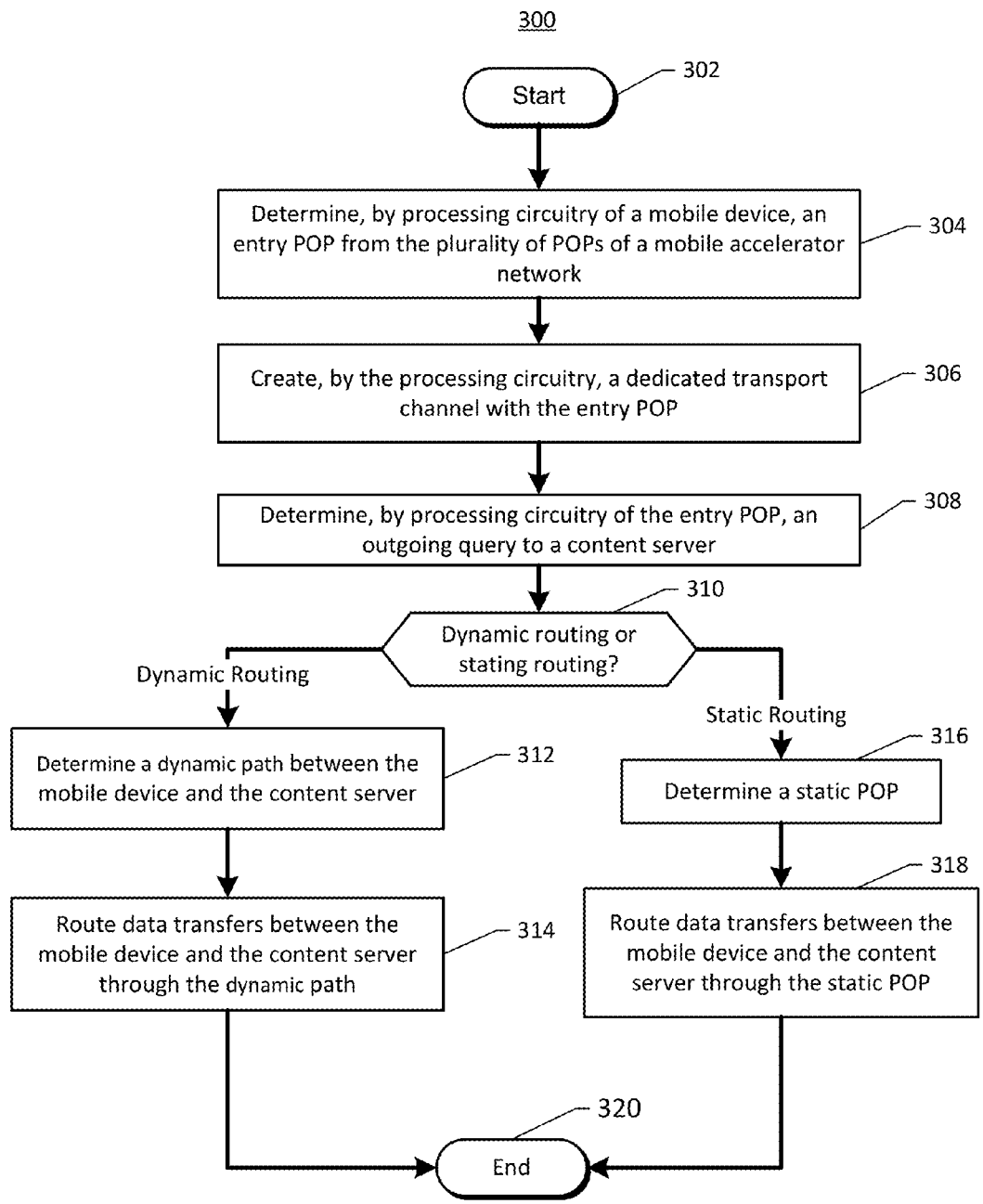
Figure 4:
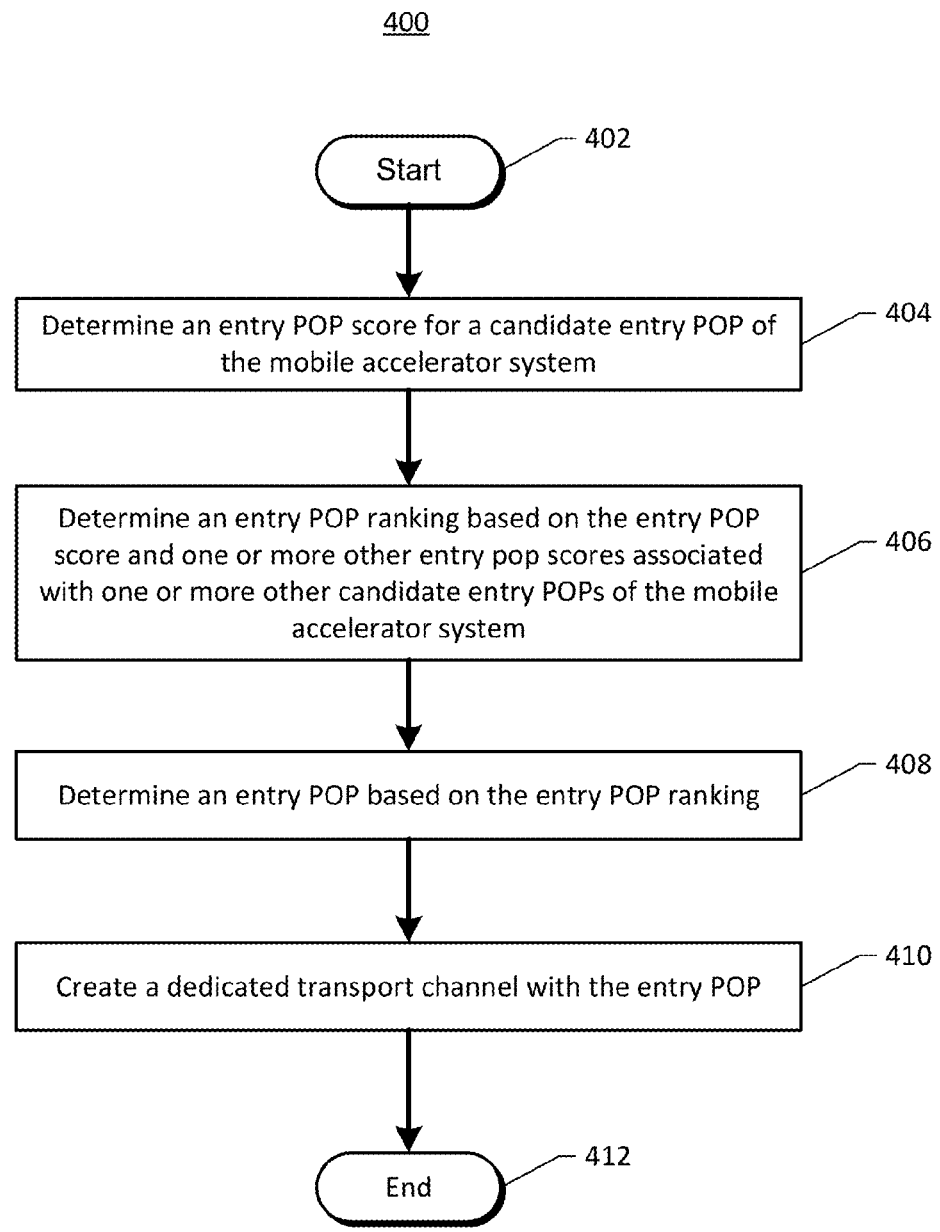
Figure 5:
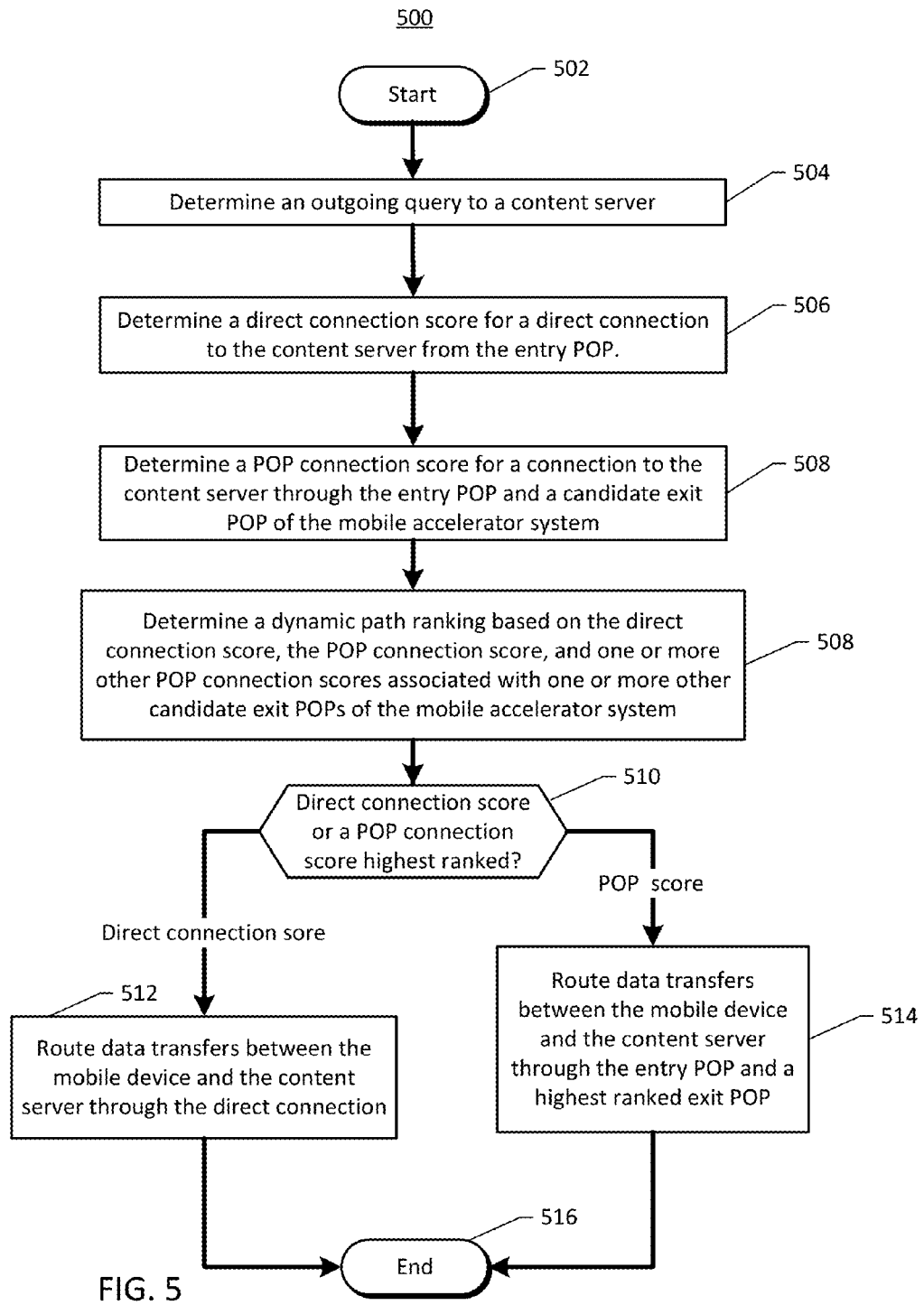
Figure 6:
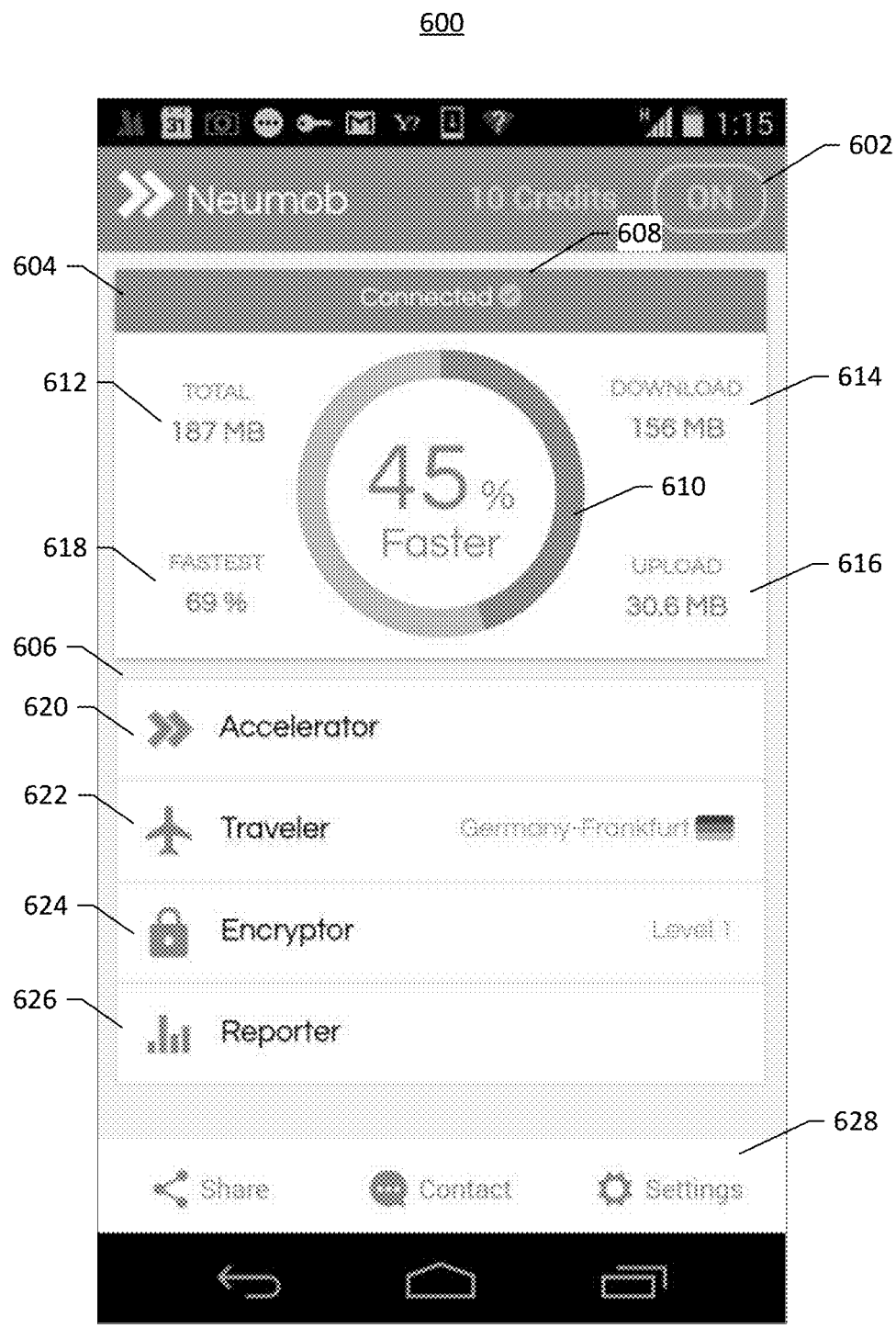
Figure 7:
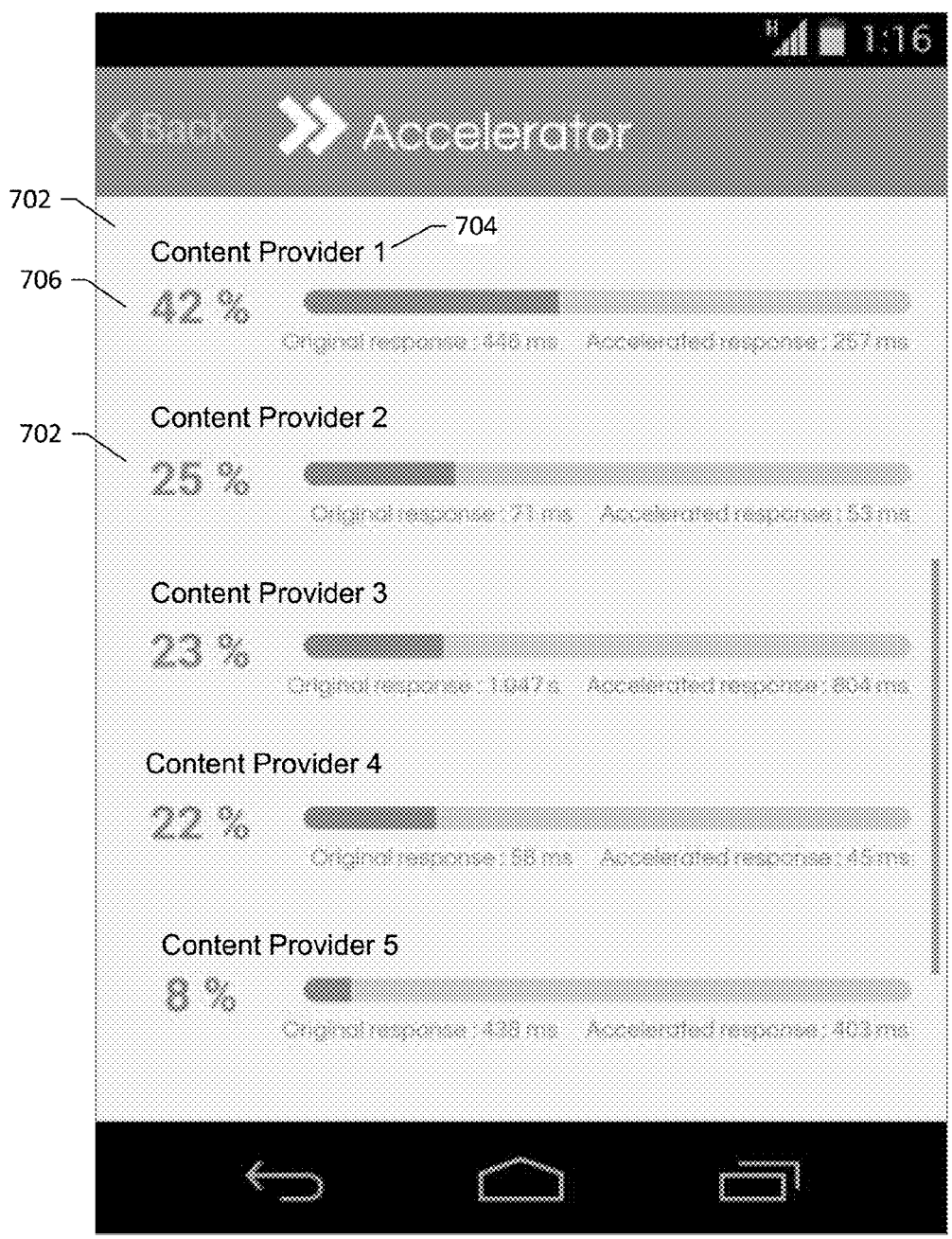
Figure 8:
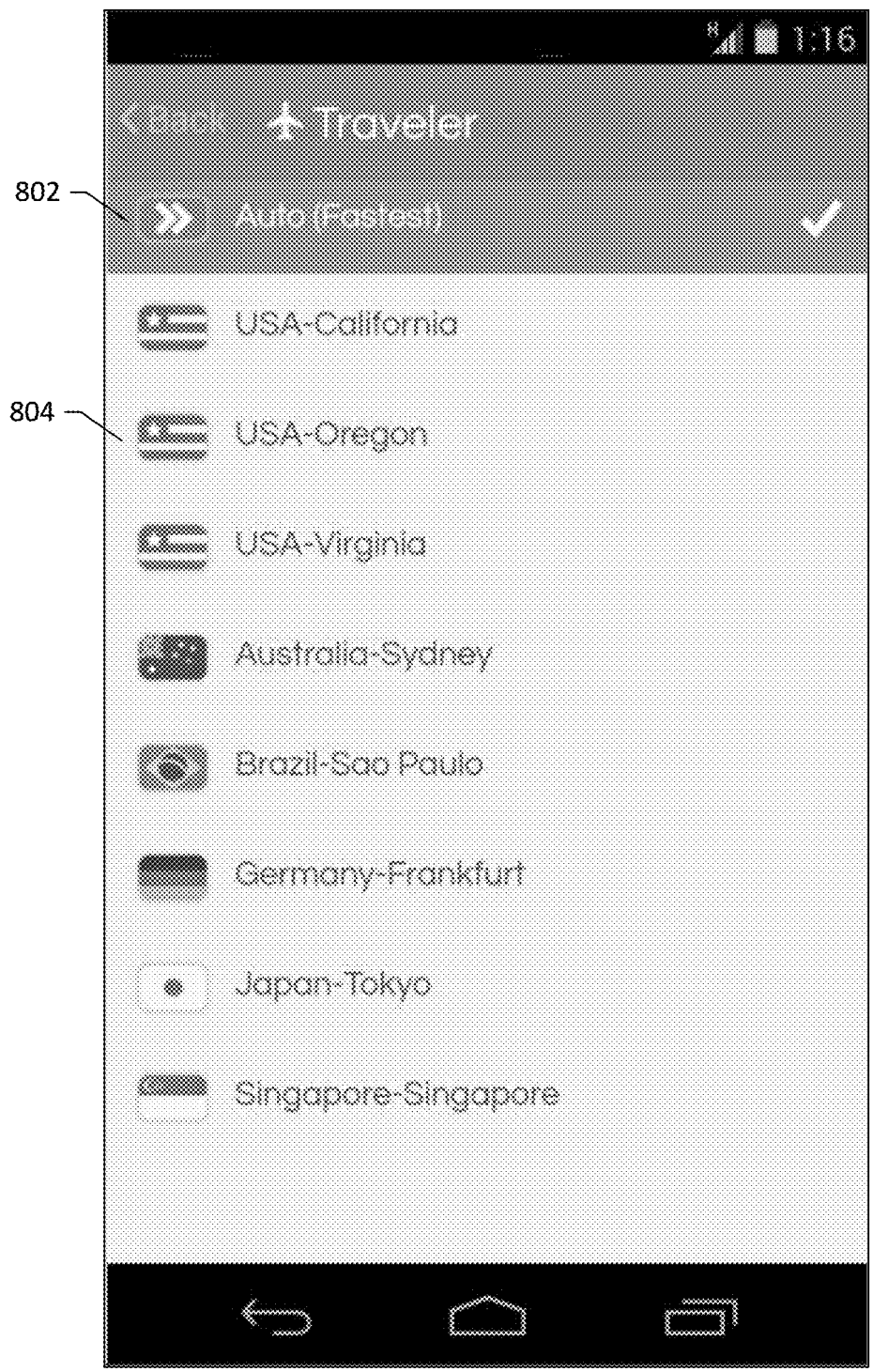
Figure 9:
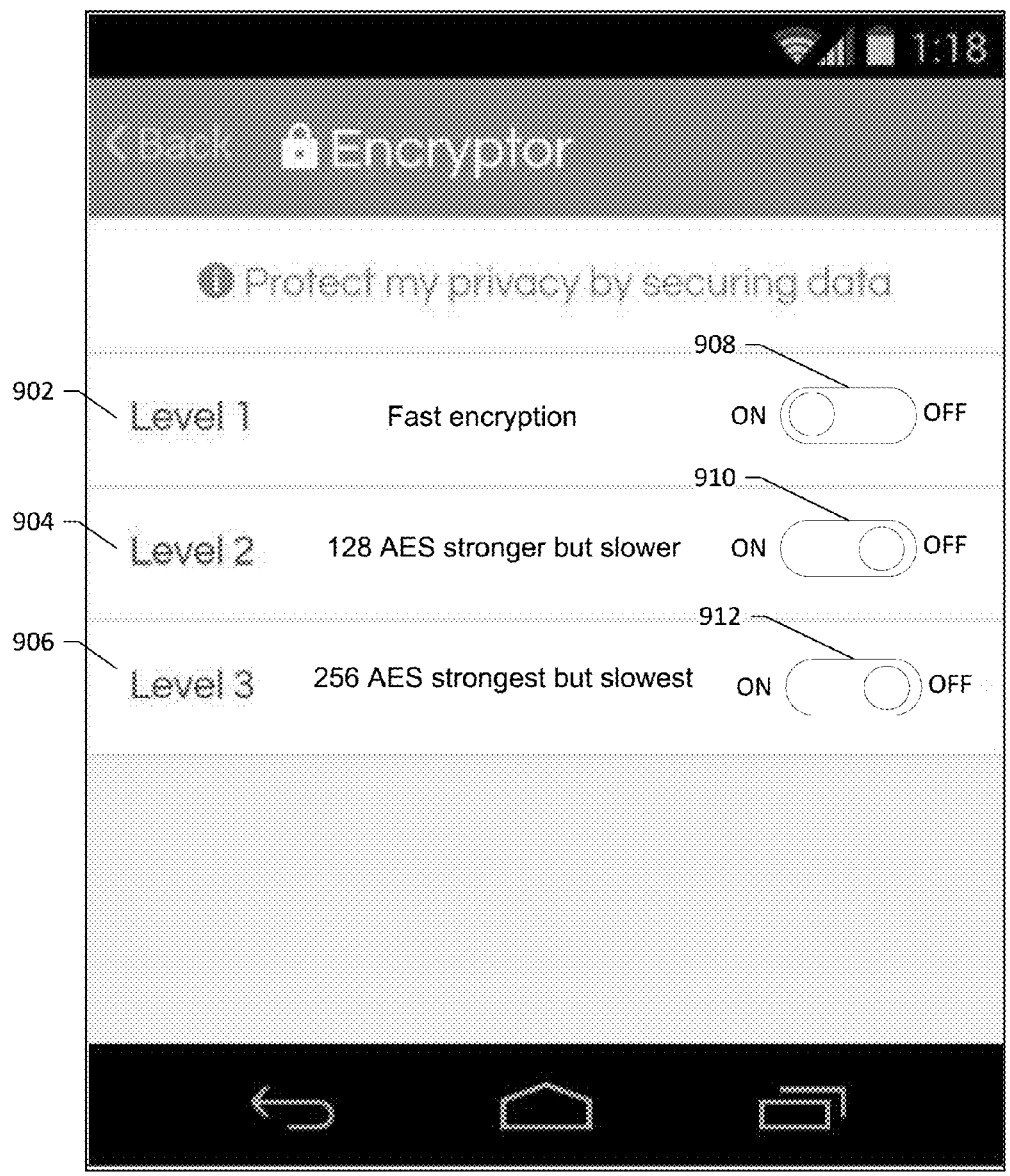
Figure 10:
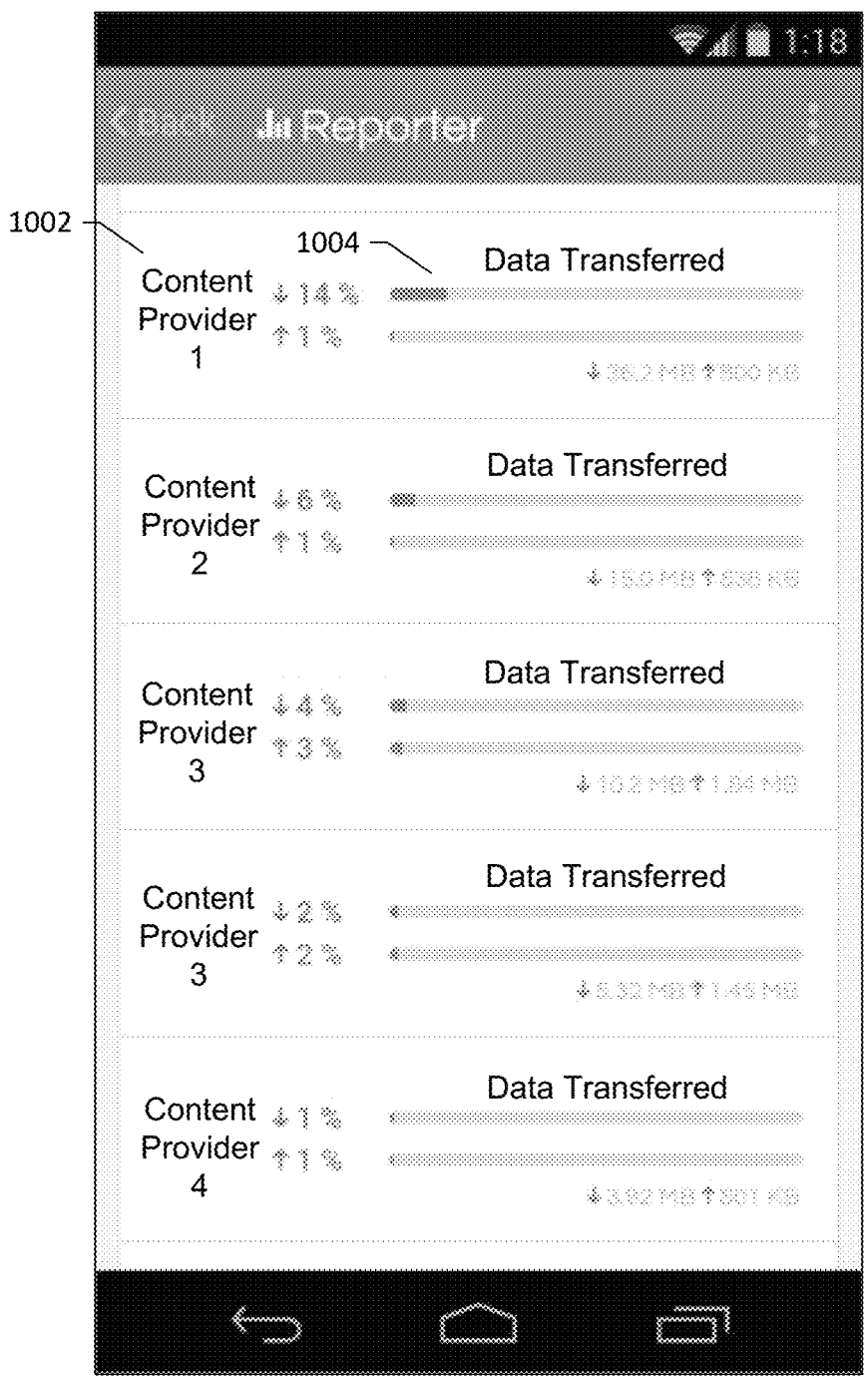
Figure 11:
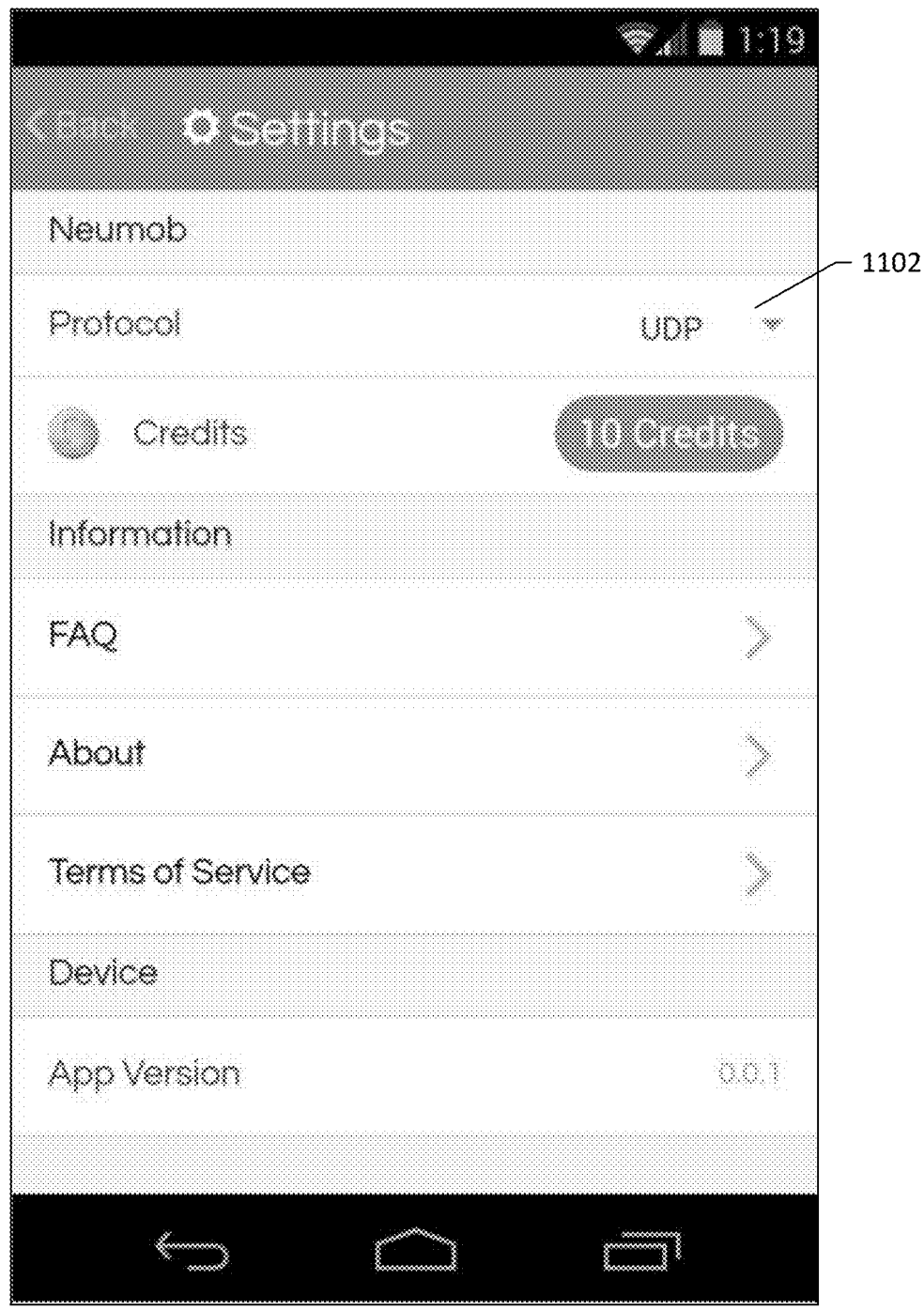

Having thus described some embodiments in general terms, reference will now be made to the accompanying drawings, which are not necessarily drawn to scale, and wherein:

FIG. 1 shows an example of a system, in accordance with some embodiments;

FIG. 2 shows a schematic block diagram of an example of a device, in accordance with some embodiments;

FIG. 3 shows an example of a method of mobile device content delivery acceleration performed in accordance with some embodiments;

FIG. 4 shows an example of a method of connecting with an entry point-of-presence (POP) of a mobile accelerator system performed in accordance with some embodiments;

FIG. 5 shows an example of a method of dynamic routing for data transfers between a mobile device and a content server performed in accordance with some embodiments;

FIG. 6 shows an example of a mobile accelerator home interface in accordance with some embodiments;

FIG. 7 shows an example of an accelerator interface in accordance with some embodiments;

FIG. 8 shows an example of a routing selection interface in accordance with some embodiments;

FIG. 9 shows an example of an encryption selection interface in accordance with some embodiments;

FIG. 10 shows an example of a data transfer reporter interface in accordance with some embodiments;

FIG. 11 shows an example of a settings interface in accordance with some embodiments; and FIGS. 12-14 show examples of latency tables in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Some embodiments discussed herein may provide for mobile device content delivery acceleration. For example, a mobile accelerator application may execute on the mobile device that monitors outgoing queries to content servers performed by the mobile device. The queries may be generated, for example, by virtually any application executing on the mobile device including an Internet browser application or other mobile applications (e.g., games, streaming audio or video, email, etc.) that access data from remote content servers via the Internet. In that sense, the techniques discussed herein can provide content delivery acceleration to various third party applications, and without necessarily requiring any modifications to the third party applications themselves.

In some embodiments, the mobile device content delivery acceleration may be provided by a mobile accelerator system including a multiple point-of-presences (POPs) for accessing content from a content server. The POPs may be located at different geographical locations to provide a collection of access points to the Internet from the different geographical locations. A mobile device may form a dedicated transport channel with a fastest (e.g., based on synthetic latency) POP of the mobile accelerator system, or entry POP. The entry POP may then be configured to route data transfers between the mobile device and the content server through one or more POPs of the mobile accelerator system. Based on a dynamic path determination that optimizes connection quality measures such as synthetic latency, the data transfers may be routed from the mobile device, through the mobile accelerator system (e.g., to an entry POP via the dedicated transport channel, and then to a fastest exit POP), and then to the content server.

Exemplary Architecture

FIG. 1 shows an example system 100 in accordance with some embodiments. System 100 may include one or more mobile devices 102 (e.g., mobile devices 102a-102c), mobile accelerator system 104, network 106, and content server 108. As discussed in greater detail below, a mobile device 102 may be connected with content server 108 via one or more of mobile accelerator system 104 and network 106 to provide content delivery acceleration between content server 108 and mobile device 102.

Mobile devices 102a-102b may each be associated with a user. Although three mobile devices are shown in FIG. 1, system 100 may include any number of mobile devices that may be associated with various other users. Mobile device 102 may include a cellular telephone (including smartphones and/or other types of mobile telephones), tablet, laptop, electronic reader, e-book device, media device, and/or or the like. In some embodiments, some or all of the techniques discussed herein with respect to mobile device 102 and mobile acceleration may be applicable to a stationary device, such as a desktop computer, terminal, work station, server, among other things.

Mobile accelerator system 104 may include a plurality of point of presences, or POPs 110. A "POP," as used herein, refers to one or more servers, routers, Asynchronous Transfer Mode (ATM) switches, digital/analog call aggregators, etc. that provide an access point to network 106 (e.g., the Internet). Although shown as being separate from network 106, in some embodiments, the mobile accelerator system 104 may supported by an Internet backbone provided by the network 106. The mobile device 102 may include a content router module and/or circuitry configured to determine the entry POP 110a and facilitate the creation of a dedicated transport channel (e.g., a wireless virtual private network (VPN) tunnel) with the entry POP 110a via the connection 112. In some embodiments, a single POP 110 may include multiple servers, and load balancing algorithms may be used to balance traffic between the multiple servers of the POP 110.

Each of the POPs 110 may be connected with each other and located at different geographical locations to provide a collection of access points to network 106 from the different geographical locations. For example, in a six POP mobile accelerator system 104, interconnected POPs 110 may be located in Singapore, Seoul, San Francisco, Tokyo, Dallas, and New York to form the mobile accelerator system 104. In some embodiments, each POP 110 may include a content router module and/or circuitry configured to determine a path in the dynamic path routing and facilitate the routing accordingly. For example, an entry POP 110a may be configured to determine a POP 110 of the mobile accelerator system 104 as an exit POP 110b, such as based on exit POP 110b providing the fastest direct connection access point to the content server 108. In some embodiments, the content router module may be located in one or more components of system 100 and may be configured to perform dynamic path determination. For example, the content router module may be located in mobile device 102 and/or some or all of the POPs 110.

In some embodiments, a content router module may be configured to provide a content routing service to various other component of system 100 through which data transfers may be routed. For example, where the content router module is located at the entry POP 110, the entry POP 110 may be configured to receive content server queries and determine scores associated with the various available paths. The content router module may be further configured to return to the requesting device a next POP for routing data transfers. In response, the requesting device (e.g., or current POP) may be further configured to determine whether the current POP should either route data transfers to a second POP 110, or to the content server 108 via a direct connection (e.g., without any other intervening POPs 110). Where the current POP routes directly to the content server 108, the current POP may be defined as an exit POP 110b. In contrast, where the current POP routes to a second POP 110, the second POP 110 may then act as the current POP and (e.g., based on routing instructions from the content router module) either route data transfers to third POP 110 (e.g., which may be an exit POP or otherwise), or to the content server 108 via a direct connection as an exit POP 110b.

The mobile device 102 may connect with an entry POP 110a of the mobile accelerator system 104 via connection 112. Connection 112 may include a wireless connection utilizing Wi-Fi and/or mobile broadband technologies (e.g., 2G, 3G, and/or long-term evolution (LTE), etc.). In some embodiments, connection 112 may additionally or alternatively include a wired connection, such as Ethernet, universal serial bus (USB), wired broadband, etc. The connection 112 may represent a "last mile" or final leg of the system 100 for content delivery from content server 108 to the mobile device 102.

Entry POP 110a may be selected from the POPs 110 of the mobile accelerator system 104 based on a ranking of entry POP scores associated with each of the POPs 110. An "entry POP score," as used herein, refers to a measure of the quality of the connection 112 between the mobile device 102 and a candidate POP 110. The entry POP score may be determined based on synthetic latency, which may be a value obtained based on one or more of RTT, packet loss, geographic information, POP capacity and health check (e.g., CPU and I/O load on the POP), etc. between the mobile device 102 and candidate POP 110. For example, a synthetic latency of between the mobile device 102 and the entry POP 110a for a mobile broadband connection, where both the mobile device 102 and the entry POP 110a are located in Singapore, may be around 80 to 500 milliseconds. Additionally or alternatively, the entry POP score may be determined based on POP status, such as POP capacity and/or POP health. In yet another example, the entry POP score and/or entry POP may be determined based on a user selection and/or other static configuration.

In some embodiments, a mobile device 102 and/or entry POP 110a may be configured to optimize the connection between the mobile device 102 and the entry POP 110a. In addition to selecting the entry POP 110a and facilitating connections with the entry POP 110a, for example, the mobile device 102 may be further configured to provide various functionality such as user authentication, encryption for data transfers to the entry POP 110a, data compression (e.g., dictionary based compression), user datagram protocol (UDP) optimization, transport layer security (TLS) optimization, transmission control protocol (TCP) optimization, and/or hypertext transfer protocol (HTTP) optimization. The connection between the mobile device 102 and the entry POP 110a may be further configured to facilitate data routing, such as through Layer 3 and/or Layer 4 switches. In some embodiments, a mobile device 102 may also include a POP or be a POP 110 of the mobile accelerator system 104. For example, a mobile device 102 may include a content router module as discussed herein for a POP 110, and may be referred to as device POP. Furthermore, the mobile device 102 may be further configured to perform POP functionality with respect to data routing, such as by serving as intervening POP 110 of the mobile accelerator system 104 for a connection between a second mobile device 102 and a second content server 108.

The content server 108 and the network 106 may be connected with an exit POP 110b of the mobile accelerator system 104 via a connection 116. In general, dynamic paths may be determined based on scoring and ranking the various available paths between the mobile device 102 and content server 108. For example, exit POP 110b may be selected from the POPs 110 of the mobile accelerator system 104 based on a ranking of exit POP scores associated with each of the POPs 110. An "exit POP score," as used herein, refers to a measure of the quality of the connection 116 between a candidate POP 110 and the content server 108. The techniques discussed herein for determining the entry POP score may be applicable to the exit POP score. For example, the exit POP score may be determined based on synthetic latency between the exit POP 110b and content server 106 through the network 106, among other things. An exemplary synthetic latency of between the exit POP 110b and the content server 108, where both are located in New York, may be around 20 milliseconds. In general, the exit POP 110b may be selected from the POPs 110 based on the quality of the connections between the POPs 110 and the content server 108, such as based on lowest synthetic latency.

The content server 108 may be an original host of content, or alternatively, may be a dedicated content delivery server or other redundant host. For example, the content server 108 may be one or multiple content delivery servers of a content delivery network (CDN). In some embodiments, such as when content is available from multiple content servers, the content server 108 may be determined as a nearest content server capable of providing the content to the mobile device 102 and/or a POP 110 (e.g., such as based on a domain name service (DNS) lookup for a uniform resource locator (URL) reference to the desired content). In some embodiments, content server 108 may be a user device, such as a mobile device 102 configured to provide content delivery via the network 106.

In some embodiments, the connections between POPs 110 (e.g., the entry POP 110a and the exit POP 110b) may be supported with various functionality such transmission control protocol (TCP) optimization (e.g., for a long haul network), hypertext transfer protocol (HTTP) optimization (e.g., caching, front-end optimization), data compression (e.g., dictionary based compression), encryption for data transfers to the mobile device 102, connection pooling, and/or HTTP keep-alive. The connection between the POPs 110 may be further configured to facilitate data routing, such as through Layer 4 switches.

In some embodiments, the content router module (e.g. of a POP 110, such as entry POP 110a, and/or the mobile device 102) may be configured to determine the exit POP 110b and facilitate the routing of data transfers between the mobile device 102 and the content server 108 through the exit POP 110b. The connection 116 may represent a "first mile" or first leg of the system 100 for content delivery from content server 108 to the mobile device 102. In some embodiments, the connections between the exit POP 110b and content servers 108 may be supported with various functionality such TCP optimization, connection pooling, and HTTP keep-alive.

In addition to optimization of the last mile and file mile connections, the content router module and/or circuitry (e.g., of the mobile device and/or entry POP 110a) may further be configured to determine POP-to-POP scores between the POPs 110 of the mobile accelerator system 104. A "POP-to-POP score," as used herein, refers to a measure of the quality of the connection between two POPs 110, such as between entry POP 110a and exit POP 110b. The connection between the entry POP 110 and the exit POP 110b may represent "middle mile" or middle leg of the system 100. The techniques discussed herein for determining the entry POP score and/or exit POP score may be applicable to the exit POP score. For example, the POP-to-POP score may be determined based on synthetic latency between the entry POP 110 and the exit POP 110b. An exemplary synthetic latency of between an entry POP and an exit POP, such as where the entry POP is located in Singapore and the exit POP is located in New York, may be around 250 milliseconds. In some embodiments, a POP-to-POP score may include one or more intervening POPs 110 between the entry POP 110a and the exit POP 110b. In some embodiments, a POP-to-POP score may be determined for each (e.g., non-node-recursive) path between the entry POP 110a and exit POP 110b through one or more other POPS 110 of the mobile accelerator system 104.

In some embodiments, the content router module may be configured to determine POP connection scores to generate a dynamic path ranking. A "POP connection score," as used herein, refers to a measure of the quality of the entire path (e.g., including the first mile, middle mile, and last mile) between the mobile device 102 and the content server 108 through the mobile accelerator system 104. In some examples, the path through the mobile accelerator system 104 may include the entry POP 110a and the exit POP 110b. Here, the POP connection score may be determined based on an entry POP score between mobile device 102 and entry POP 110a, a POP-to-POP score between entry POP 110a and exit POP 110b, and an exit POP score between exit POP 110b and content server 108. In another example, the path through the mobile accelerator system 104 may include only a single entry/exit POP that serves as both the entry POP and the exit POP. Here, the POP connection score may be determined based on an entry POP score between mobile device 102 and the entry/exit POP 110, and an exit POP score between entry/exit POP 110 and the content server 108.

In addition or alternative to connections through between the mobile device 102 and the content server 108 between the mobile accelerator system 104, system 100 may provide for a direct connection between the mobile device 102 and the content server 108 through network 106, bypassing the mobile accelerator system 104 when suitable. For example, the content router module and/or circuitry of the mobile device 102 and/or entry POP 110a may be configured to determine a "direct connection score," which as used herein, refers to a measure of the quality of the connection between the mobile device 102 and the content server 108 through network 106 and without traversing the mobile accelerator system 104. The techniques discussed herein for determining the POP scores may be applicable to the direct connection score. For example, the direct connection score may be determined based on synthetic latency between the mobile device 102 and content server 106 through the network 106 via connection 114 (e.g., rather than the mobile accelerator system 104). As such, the mobile device 102 may provide or otherwise behave like a POP, providing an access point to the Internet via the direct connection 114. Connection 114, like connection 112, may represent the last mile for system 100, and may include a wireless connection utilizing Wi-Fi and/or mobile broadband technologies and/or a wired connection.

In some embodiments, the content router module may be configured to keep updated connection scores for dynamic path ranking. For example, each POP connection score (e.g., including the entry POP score, POP-to-POP score, and/or exit POP score) or direct connection score may be associated with a time to live (TTL) defining a period of time in which the connection score remains valid. An example TTL may be 200 seconds, and the content router module may be configured to update the measurements 200 seconds after performing the previous measurement. As such, routing decisions by the content router module may be determined based on fresh connection quality information. Additional details regarding dynamic path determinations are discussed below in connection with methods 300 and 500 and FIGS. 3 and 5.

Network 106 may include a public network such as the Internet. Network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or Wi-Max network. Furthermore, network 106 may include a public network (e.g., the Internet), a private network (e.g., the network associated with the mobile accelerator system 104), and/or combinations thereof, and may utilize a variety of networking protocols now available or later developed including, but not limited to TCP/IP based networking protocols.

FIG. 2 shows a schematic block diagram of example circuitry 200, some or all of which may be included in a mobile device 102 and/or a POP 110 of the mobile accelerator system 104. In accordance with some example embodiments, circuitry 200 may include various means for performing some or all of the functionality discussed herein, such as one or more processors 202, memories 204, communications modules 206, input/output modules 208, and/or content router module 210.

In some embodiments, such as when circuitry 200 is included the mobile device 102 and/or a POP 110, content router module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing components or means. The plurality of processing components may be embodied on a single computing device or may be distributed across a plurality of computing devices collectively configured to function as circuitry 200. The plurality of processing components may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein such as with respect to methods 300-500 shown in FIGS. 3-5 respectively.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 or other computing device. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, Wi-Fi (e.g., a 802.11 protocol, etc.), Bluetooth, radio frequency systems (e.g., 900 MHz, 1.4 GHz, and 5.6 GHz communication systems), infrared, GSM, GSM plus EDGE, CDMA, 2G, 3G, LTE, mobile broadband, and other cellular protocols, VOIP, or any other suitable protocol.

Input/output module 208 may be in communication with processor 202 to receive an indication of an input and/or to provide an audible, visual, mechanical, or other output. Some example inputs discussed herein may include user inputs for interacting with remote content servers, as well as for user inputs that configure parameters or settings of mobile acceleration. In that sense, input/output module 208 may include means for performing analog-to-digital and/or digital-to-analog data conversions. Input/output module 208 may include support, for example, for a display, touch sensor, touch screen, keyboard, button, click wheel, mouse, joystick, an image capturing device, microphone, speaker, biometric scanner, camera, motion sensor, and/or other input/output mechanisms. In embodiments where circuitry 200 may be implemented as a POP, server or database, aspects of input/output module 208 may be reduced as compared to embodiments where circuitry 200 may be implemented as an end-user machine or other type of device designed for complex user interactions (e.g., mobile device 102). In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on a mobile device used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, content router module 210 may also or instead be included and configured to perform the functionality discussed herein related determining optimal data transfer path and/or nodes, and routing the data transfers accordingly. In some embodiments, some or all of the functionality of the content router module 210 may be performed by processor 202. In this regard, the example processes and algorithms discussed herein can be performed by at least one processor 202 and/or content router module 210. For example, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Mobile Device Acceleration

FIGS. 3-5 show flowcharts of example methods 300-500 related to mobile acceleration, respectively, in accordance with some embodiments. Most of the steps of methods 300-500 are generally discussed herein as being performed by components of system 100 discussed above. However, other suitable devices, apparatus, systems and/or circuitry may be used. FIGS. 6-11 show example interfaces or displays that may be presented on the mobile device 102 to facilitate user interactions and configurations of the mobile acceleration.

FIG. 3 shows an example of a method 300 of mobile device content delivery acceleration performed in accordance with some embodiments. Method 300 may begin at 302 and proceed to 304, where processing circuitry of a mobile device 102 (e.g., content router module 210) may be configured to determine an entry POP 110a from a plurality of POPs 110 of a mobile accelerator system 104. The entry POP may be selected from the POPs 110 based on entry POP score. At 305, the mobile device 102 may be configured to create a dedicated transport channel tunnel with the entry POP 110a. The dedicated transport channel, for example, may include a virtual private network (VPN) tunnel. Additional details regarding steps 304 and 306 are discussed in connection with method 400 and FIG. 4 below, and thus are not repeated here to avoid overcomplicating the disclosure.

In some embodiments, the mobile device 102 may be configured to interface with the mobile accelerator system 104 based on configurations by a mobile accelerator application. The mobile accelerator application, for example, may be downloaded from a content server 108 or other data provider (e.g., a server associated with the mobile accelerator system 104) and installed to the mobile operating system of the mobile device 102. In some embodiments, once installed and executing on the mobile device 102, the mobile accelerator application may provide a service to other applications and/or processes executing on the mobile device 102 that perform data transfers with various content servers 108. As discussed in greater detail below, for example, the mobile device 102 may be configured to monitor outbound queries or inbound data of the other applications and perform data routing as a service for mobile acceleration of the data transfers.

FIG. 6 shows an example of a mobile accelerator home interface 600 in accordance with some embodiments. Mobile accelerator home interface 600 is an example of a user interface that may be provided by the mobile accelerator application or otherwise by the processing circuitry of the mobile device 102, and may serve as the primary information display and navigation hub of the mobile accelerator application. In some embodiments, the mobile device 102 may be configured to receive user inputs (e.g., via a touchscreen and/or other input device) for interaction with the mobile accelerator home interface 600 as discussed in further detail below.

Mobile accelerator home interface 600 may include mobile acceleration toggle button 602, mobile acceleration overview display 604, and navigation menu 606. Toggle button 602 may provide a fast on/off switch for mobile acceleration. For example, when toggle button 602 is toggled on, queries and other data transfers between the mobile device 102 and the content server 108 may be routed based on methods 300-500 as discussed herein. However, when toggle button 602 is toggled off, mobile device 102 may be configured to handle queries and other data transfers with content server 108 without mobile acceleration, such as using the direct connection 114 to content server 108 via network 106 (e.g., the Internet) and without traversing the mobile accelerator system 104.

Mobile acceleration overview display 604 may be configured to provide an overview of data transfers by the mobile device 102 that have been handled via mobile acceleration. Mobile acceleration overview display 604 may include a connection status 608, average acceleration indicator 610, total data transferred indicator 612, total data download indicator 614, total data upload indicator 616, and fastest acceleration indicator 618. The connection status 608 may provide an indication that the mobile device 102 has successfully connected with an entry POP 110a and/or other component of the mobile accelerator system 104. The total data transferred indicator 612, total data download indicator 614, and total data upload indicator 616 show cumulative data amounts that have been transferred or optimally routed using mobile acceleration. The average acceleration indicator 610 may provide an indication of how much faster data transfers to each applicable content server are increased on average relative to data transfers that are not accelerated through the mobile acceleration system 104. The fastest acceleration indicator 618 may provide an indication the most accelerated data transfer to connected content server 108.

Navigation menu 606 may provide links or references to other interfaces supporting functionality such as reporting and configuration of the mobile acceleration application. Navigation menu 606 may include an accelerator button 620, a routing button 622, an encryption button 624, a data transfer reporter button 626, and a settings button 628. FIG. 11 shows an example of a settings interface 1100 in accordance with some embodiments, which is an example of an interface that may be provided based on user selection of the settings button 628. As shown, the settings interface 1100 may be used to configure the mobile acceleration functionality. The user can select between various transport protocol used between mobile device and entry POP using protocol selector 1102, such as selecting between the user datagram protocol (UDP) and the transmission control protocol (TCP). The various interfaces, shown in FIGS. 7-11, are discussed in greater detail below.

At 308-320, data transfers between the mobile device 102 and the content server may be accelerated based on programmatic routing, such as through the mobile accelerator system 104. Steps 308-320 are generally discussed as being performed by the processing circuitry and/or a content router module of the entry POP 110a determined at 304. However, one or more of the steps 308-320 may alternatively or additionally be performed by the mobile device 102, such as when a content router module is located in the mobile device 102.

In some embodiments, a content router module may be included in the mobile device 102 and in the POPs 110 of the mobile accelerator system 104. The content router module of the mobile device 102 may be configured to support the selection of an optimal entry POP 110a, and the content router module of the entry POP 110a may be configured to support the selection of an optimal next routing destination, which may or may not be the exit POP 110b. In some embodiments, a mobile device 102 may be used as a POP 110 of the mobile accelerator system 104. Here, a universal or common content router module may provide support for both mobile device POPs and dedicated POPs 110. In some embodiments, some or all of the POPs 110 of the mobile accelerator system 104 may be a mobile device 102.

At 308, the processing circuitry of the entry POP 110a (e.g., a content router module) may be configured to determine a query to a content server 108. The query may be generated by the mobile device 102, and provided to the entry POP 110a via the dedicated transport channel and/or connection 112. In some embodiments, the query may be generated by a separate application executing on the mobile device 102, such as by a mobile browser and/or other mobile application. Here, the mobile accelerator application may be configured to execute in the background of the mobile device operating system. The mobile accelerator application may be further configured to monitor the outgoing queries from one or more executing applications and may forward or otherwise provide the outgoing queries to the content router module based on the monitoring.

FIG. 7 shows an example of an accelerator interface 700 in accordance with some embodiments. Accelerator interface 700 may be presented on the mobile device 102 (e.g., a display) in response to user selection of the accelerator button 620 in mobile acceleration overview display 604. Accelerator interface 700 may be configured to provide a display indicating connections to content servers 108, as well as mobile acceleration statistics 706 associated with each of the content server connections. For example, accelerator listing 702 is associated with a content provider 704, which may be associated with a query at 308. Mobile acceleration statistics 706 may indicate the accelerated data transfer speed (e.g., 257 milliseconds) with the content provider 704 using mobile accelerator system 104, the non-accelerated data transfer speed (e.g., 446 milliseconds), and the relative speed increase (e.g., 42%). Accelerator interface 700 may include multiple accelerator listings 702, with each listing being associated with a content provider and/or content server 108.

At 310, the entry POP 110a may be configured to determine whether to perform dynamic routing or static routing for data transfers between the mobile device 102 and the content server 108. The determination of dynamic or static routing may be based on user settings. In some embodiments, dynamic routing may be used by default, and static routing may be enabled based on user selection of a static POP and/or geo-location. "Dynamic routing," as used herein, refers to a programmatic routing of the data transfers based on a dynamically optimized path. As discussed in greater detail below in connection with method 500 and FIG. 5, the dynamically optimized path may include traversal of the mobile accelerator system 104. Alternatively, where a direct connection to the content server 108 is more optimal, the dynamically optimized path may avoid traversing the mobile accelerator system 104.

"Static routing," as used herein, refers to a routing of the data transferred based on a predefined POP 110 of the mobile accelerator system 104. Static routing may allow the mobile device 102 to access the content server 108 from the location of the predefined POP 110. For example, a content server 108 may be associated with a geo-location limitation, such as a Japanese web site that cannot be accessed from a device located in the United States. Here, the mobile accelerator system 104 may provide for the access to the geo-location limited content server 108 based on routing data transfers through a POP 110 located in Japan, or other permissible geo-location.

FIG. 8 shows an example of a routing selection interface 800 in accordance with some embodiments. Routing selection interface 800 may include dynamic path button 802 and one or more static path buttons 804. The user of mobile device 102 may be allowed to select one of the routing options presented by routing selection interface 800. Dynamic path button 802 may enable the dynamic routing functionality discussed herein. In contrast, the one or more static path buttons 804 may each be associated with a different POP 110. Each POP 110 may be associated with a different geo-location, which may also be indicated in the routing selection interface 800. In some embodiments, the mobile device 102 and/or entry POP 110a may be configured to determine whether to perform dynamic routing or static routing based on the user selection using the routing selection interface 800. In some embodiments, the static POP may be programmatically determined based on the geo-location limitations of the content server 108. For example, based on the content server 108 being accessible only in Japan, data transfers between the mobile device 102 and the content server 108 may be programmatically routed through a static POP located in Japan.

In some embodiments, the content router module (e.g., of a POP 110 and/or the mobile device 102) may be configured to provide a software defined content router service to requesting device POPs and/or POPs 110. For example, where the content router module is located in a POP 110 (e.g., entry POP 110a), the content router module may be configured to handle requests for routing to an exit POP 110b (or an intervening next POP of system 104) generated based on queries to content servers 108. The next POP may also request routing from the content router module, which may then make further routing determination, such as whether the next POP should route the data transfer to a next POP, or outside of the mobile accelerator system 104 via a direct connection to the content server 108, and so forth. As discussed above, the dynamic path routing may be determined by the content router module based on connection scores.

In some embodiments, the content router module may be configured to receive requests including the following input parameters: an RFlag parameter defining a selection between dynamic or static routing; a static POP identifier in the case of static routing; a fully qualified domain name (FQDN) of the destination address; an IP of the destination address (optional, and if available); a selected protocol (e.g., HTTP, HTTPS, etc.); and a port number of destination (e.g., port 80).

The input parameters may be passed to the content router module, which can return the following parameters: a DFlag parameter defining whether the traffic optimized when sent from the POP 110 directly to the content server 108 (e.g., DFlag=DIRECT) or to the next POP (e.g., exit POP 110b) of the mobile accelerator system 104 (e.g., DFlag=THROUGH_POP); and the POP ID of the next POP (if applicable). An example code for implementing the functionality discussed above is shown below in Equation 1:

($D$Flag, POPID)=SDCR.Query($R$Flag, FQDN, IPaddress, HTTP, 80)

An example service call based on Equation 1, using parameters for implementing a dynamic routing request to a content server associated with the FDNQ www.foo.com, is shown below in Equation 2:

($D$Flag, POPID)=SDCR.Query(ROUTE_DYNAMIC, www.foo.com, NULL, HTTP, 80)

Based on the query of Equation 2, and where it is determined that the content router module should route data to a next POP 110, the DFlag parameter may return as THROUGH_POP and the POPID parameter may return the POP identifier of the next POP 110. In contrast, where it is determined that the content router module should route data directly to the content server 108, the DFlag parameter may return as DIRECT and the POPID parameter may be null or otherwise unused during the data routing. Additional details with respect to determination of the return parameters (e.g., based on synthetic latency) are discussed below in connection with method 500 and FIG. 5.

In some embodiments, the content router module may also be configured to handle requests for static routing. An example code for implementing a static routing, through the NRT POP 110 and for access to a content server associated with the FDNQ www.foo.com, is shown below in Equation 3:

($D$Flag, POPID)=SDCR.Query(ROUTE_STATIC_NRT, www.foo.com, NULL, HTTP, 80)

Based on the query of Equation 3, the DFlag parameter may return as THROUGH_POP and the POPID parameter may return the POP identifier of the static POP (e.g., POPID=NRT).

After the return query parameters DFlag and POPID have been determined by the content router module, the requesting, current POP may route data transfers accordingly. For example, if DFlag=DIRECT, traffic may be routed from the current POP to the content server 108 via a direct connection. If DFlag=THROUGH_POP, the traffic may be routed from the current POP to the next POP, as identified by the POPID parameter. The next POP, as discussed above, may also request routing from the content router module, and so forth.

As discussed above, the content router module may reside in the mobile device 102 (e.g., acting as a device POP) and/or in entry POPs 110a of the mobile accelerator system 104. When the content router service is called by the mobile device 102, the content router module may be configured to route data transfer either to an entry POP 110a or the content server 108 via a direct connection. When the content router service is called by the entry POP 110a, the content router module may be configured to route data transfers to either a next POP 110 (e.g., exit POP 110b) or the content server 108 via a direct connection from the entry POP 110a.

In response to determining to perform dynamic routing, method 300 may proceed to 312, where the entry POP 110a may be configured to determine at least a portion of a dynamic path between the mobile device and the content server. At 314, the entry POP 110a may be configured to route data transfers between the mobile device and the content server through least a portion of the dynamic path. Additional details with respect to dynamic path ranking are discussed below in connection with method 500 and FIG. 5, and are not repeated here to avoid overcomplicating the disclosure.

Returning to 310, in response to determining to perform static routing, method 300 may proceed to 316, where the entry POP 110a may be configured to determine a static POP 110. As discussed above, the static POP 110 may be determined based on user selection or programmatically based on geo-limitations.

At 318, the entry POP 110a may be configured to route data transfers between the mobile device and the content server through the static POP. For example, the determined static POP may be used as the exit POP 110b to connect with the content server 108. In another example, a static POP may be used as both the entry POP and exit POP. Here, the determination of static routing may be performed prior to the selection of an entry POP at 304. Method 300 may then proceed to 320 and end.

FIG. 4 shows an example of a method 400 of connecting with an entry POP of a mobile accelerator system, performed in accordance with some embodiments. Method 400 may be performed at 304 and 306 of method 300.

Method 400 may begin at 402 and proceed to 404, where processing circuitry and/or the content router module of the mobile device 102 may be configured to determine an entry POP score for a candidate entry POP 110 of the mobile accelerator system 104. Some or all (e.g., each) of the POPs 110 of the mobile accelerator system 104 may be considered as a candidate entry POP to optimize the quality of the (e.g., dedicated transport channel) connection 112 between the mobile device 102 and the mobile accelerator system 104. As discussed above, the entry POP score refers to a measure of the quality of the connection 112 between the mobile device 102 and a candidate POP 110. Virtually any suitable measure of quality with respect to data transfer speeds may be used including RTT, packet loss, geographic distance, POP status, POP health, etc. In some embodiments, the entry POP score may be determined based on synthetic latency between the mobile device 102 and the candidate entry POP 110. The synthetic latency may include a combined value obtained from multiple data sources, such as RTT, packet loss, geographic information, POP capacity and health check such as CPU and I/O load on the POP, among other things.

FIG. 12 shows an example of an entry POP latency table 1200 in accordance with some embodiments. In this example, the content server 108 may be located in Japan, while a user may be attempting to access the content server 108 from a mobile device 102 located in San Jose. As shown in column 1202, the example mobile accelerator system may include three POPs 110 located respectively in San Francisco (SFO), Tokyo (NRT), and London (LHR). Mobile device 102 may be configured to generate the synthetic latencies shown in column 1102 based on probing each of the POPs 110.

In some embodiments, mobile device 102 may be configured to generate a probe message using the HTTP protocol, such as through the HEAD and/or GET methods. In some embodiments, other methods for generating the probe message may be used including methods that include larger probe message data blocks for more accurate latency measurements, or methods that include smaller probe message data blocks to minimize excessive network congestion. In some embodiments, one or more other protocols and associated methods may be used, such as the HTTPS protocol. Mobile device 102 may be further configured to monitor the response to the probe message from the content server 108 to generate the synthetic latencies, which may be used as entry POP scores. Each of the POPs 110 of the mobile accelerator system 104 may be used as a candidate entry POP, thus the mobile device 102 may be configured to determine the entry POP scores for each POP 110 of the mobile accelerator system 104. In some embodiments, entry POP scores may be determined based on a simple latency and/or health check.

In some embodiments, each entry POP score or other quality measurement may be associated with a limited lifetime in which the measurement is valid. With reference to column 1206 of the entry POP latency table 1200, the entry POP score and/or synthetic latency may be associated with a time to live (TTL) indicating the amount of time remaining before a prior measurement can longer be used. The TTL may be set at a value with sufficient frequency as to keep latency tables relevant to current network conditions, but not too frequent to avoid unnecessarily congesting the mobile accelerator system 104. For example, the TTL may be set at 200 seconds such that the entries of the POP latency table 1200 are no older than the 200 seconds TTL. In that sense, determining an entry POP score may further include determining whether an existing entry POP score is valid at a current time, and in response to determining that the existing entry POP score is invalid at the current time, determining an updated entry POP score, and associating the updated entry POP score with a limited validity lifetime or TTL.

At 406, the mobile device 102 may be configured to determine an entry POP ranking based on the entry POP score and one or more other entry pop scores associated with one or more other candidate entry POPs 110 of the mobile accelerator system 104. For example, an entry POP score may be determined for each POP 110 of the mobile accelerator system 104. With reference to column 1102 of the entry POP latency table 1200 shown in FIG. 12, SFO, NRT, and LHR may be ranked from first to last, with the lowest latency being the highest ranked entry POP score.

At 408, the mobile device 102 may be configured to determine an entry POP 110a based on the entry POP ranking. For example, the SFO entry POP may be selected based on having the lowest synthetic latency of the three probed POPs shown in entry POP latency table 1200, and thus the highest ranking based on entry POP scores.

At 410, the mobile device 102 may be configured to dedicated transport channel with the entry POP 110a. The dedicated transport channel allows the mobile device 102 to effectively access content server 108 through the mobile accelerator system 104. In some embodiments, that dedicated transport channel may include a VPN tunnel that extends the (e.g., private) mobile accelerator system 104 network across a public network, such as the Internet and/or network 106. As such, the mobile device 102 and the entry POP 110a may share data across the network 106 as if the mobile device 102 were directly connected to the mobile accelerator system 104, while benefiting from functionality, security and management policies of the mobile accelerator system 104. In some embodiments, the connection between the mobile device 102 and the entry POP 110a may include a user authentication and private address assignment (e.g., similar to DHCP). The dedicated transport channel may include a layer 3 tunnel, and the mobile device 102 and entry POP 110a may (e.g., optionally) exchange encryption keys. Once connected, internet protocol (IP) traffic from the mobile device 102 or device POP will be sent to the connected entry POP 110a. The traffic may further be optimized using various techniques such as data compression (e.g., dictionary based compression), TCP optimization (e.g., initcwind, aggressive congestion control, large window size, etc.), HTTP optimization (e.g., caching, front-end optimization), among other things.

FIG. 9 shows an example of an encryption selection interface 900 in accordance with some embodiments. The encryption selection interface 900 may be presented on the mobile device 102 in response to user selection of the encryption button 620 in mobile acceleration overview display 604. The encryption selection interface 900 may be configured to receive mobile device inputs that select the type of encryption used by dedicated transport channel. In general, encryption techniques may include a tradeoff between encryption quality and speed. Level 1 encryption 902 may include the fastest but least secure encryption method, and may be turned on or off via a level 1 toggle button 908. Level 2 encryption 904 may include the slower but more secure encryption method, such as 128 AES, and may be turned on or off via a level 2 toggle button 910. Level 3 encryption 906 may include the slowest but most secure encryption method, such as 256 AES, and may turned on or off via a level 3 toggle button 910. In some embodiments, level 1 encryption may be set on by default and/or may be fixed to maintain a minimal level of encryption strength, while a higher level encryption may be turned off by default and activated by the user. Method 400 may then proceed to 412 and end.

FIG. 5 shows an example of a method 500 of dynamic routing for data transfers between a mobile device and a content server performed in accordance with some embodiments. Method 500 may be performed at 312 and 314 of method 300, and subsequent to method 400 where the mobile device 102 has connected with the entry POP 110 via the dedicated transport channel. Method 500 is discussed as being performed by processing circuitry and/or a content router module of the entry POP 110a. However, in various embodiments, one or more of the steps of method 500 may be performed by processing circuitry and/or a content router module of the mobile device 102, or by processing circuitry and/or a content router module of a POP 110 that is different from the entry POP 110a.

Method 500 may begin at 502 and proceed to 504, where the content router module of the entry POP 110a may be configured to determine a query to a content server 108. The discussion at 308 of method 300 may be applicable at 504, and is not repeated to avoid overcomplicating the disclosure.

At 506, the entry POP 110a may be configured to determine a direct connection score for a direct connection to the content server 108. The direct connection score refers to a measure of the quality of the entire path between the mobile device 102 and the content server 108 through network 106, and without traversing the mobile accelerator system 104. The mobile device 102 may be configured to probe the content server 108 via connection 112 and network 106 (e.g., the Internet) to determine the direct connection score, either programmatically or based on receiving an instruction from the content router module.

FIG. 13 shows an example connection latency table 1300 in accordance with some embodiments. A connection latency table may include a listing of determined connection scores, including the direct connection score as shown in row 1302, and one or more POP connection scores (e.g., associated with paths that include at least one POP 110 of the mobile accelerator system 104) as shown in rows 1304-1308.

With reference to row 1302, connection latency table 1300 indicates that a direct connection (e.g., (DIRECT) in entry POP column 1310) to the domain name "www.foo.com" using the HTTP protocol (e.g., the HEAD and/or GET methods) has a synthetic latency of 100 milliseconds, which may be used as the direct connection score.

At 508, the entry POP 110a may be configured to determine a POP connection score for a connection to the content server 108 through the entry POP 110a and a candidate exit POP 110b of the mobile accelerator system 104 (e.g., a next POP 110). A POP connection score refers to a measure of the quality of the path (e.g., including the first mile, middle mile, and last mile) between the mobile device 102 and the content server 108 through one or more POPS 110 of the mobile accelerator system 104. In general, the POP connection score may be determined as a combination of the entry POP score between mobile device 102 and the entry POP 110a, the POP-to-POP score between the entry POP 110a and the exit POP 110b (and any intervening next POPs), and the exit POP score between the exit POP 110b and the content server 108 as discussed above.

With reference to FIG. 13, the SFO POP 110 discussed above has been selected as the entry POP 110a (e.g., as indicated at entry POP column 1310). Row 1304 is associated with a connection using the SFO POP 110 as both the entry POP 110a and the exit POP (as indicated at exit POP column 1312 being (DIRECT)) for connection to the content server 108, or as an "entry/exit POP" as used herein. The POP-to-POP score when utilizing an entry/exit POP may be 0 milliseconds or otherwise substantially negligible, and thus the primary contributors to the POP connection score may include the entry POP score and the exit POP score. Here, the pop connection score for the path through the SFO entry/exit OP 110 has a synthetic latency of 80 milliseconds, which is faster than the direct connection score of 100 milliseconds. Where the current POP 110 is an entry/exit POP 110, the pop connection score may include a direct connection score defined by the synthetic latency between the entry/exit POP 110 and the content server 108.

Rows 1306 and 1308 of the connection latency table 1300 are associated with connections using the SFO POP 110 as the entry POP 110a and the NRT and LHR POPS 110 as the respective exit POPs. As shown in row 1306, the connection using the NRT exit POP 110 has a POP connection score or synthetic latency of 50 milliseconds. As shown in row 1308, the connection using the LHR exit POP 110 has a POP connection score or synthetic latency of 150 milliseconds.

In some embodiments, direct connection scores and/or POP connection scores may have a limited lifetime as shown in TTL column 1316. Determining a connection score may further include determining whether an existing connection score is valid at a current time, and in response to determining that the existing connection score is invalid, determining an updated connection score, and associating the updated connection score with a limited validity lifetime or TTL.

At 510, the entry POP 110a may be configured to determine a dynamic path ranking based on the direct connection score, the POP connection score, and one or more other pop connection scores associated with one or more other candidate exit POPs 110 of the mobile accelerator system 104. With reference to FIG. 13, for example, the dynamic path ranking may be based on using the synthetic latencies shown at column 1314 as the direct connection and POP connection scores. Here, the highest ranking dynamic path is through the SFO entry POP and the NRT exit POP, the second highest ranking dynamic path is through the SFO entry/exit POP, the third highest ranking dynamic path is through the direct connection, and the lowest ranking dynamic path is through the SFO entry POP and the LHR exit POP.

In some embodiments and as discussed above, the dynamic path ranking may be used by the content router module to provide a content router service to requesting POPs. The content router service may return for each requesting POP, and based on connection scores, whether to route data transfers from the requesting POP to either (a) a next POP 110 or (b) a direct connection to the content server 106 through the requesting POP 110. Where the requesting POP is the entry POP 110a and using the current example, option (a) using the NRT POP as the next POP 110 is associated with the highest dynamic path rank, and thus may be selected instead of option (b). In some embodiments, the next POP may then also request routing from the content router service, and may receive a suitable routing instruction based on the dynamic path ranking, and so forth.

In some embodiments, dynamic paths may be used in response to partial network outages. FIG. 14 shows an example connection latency table 1400 in accordance with some embodiments. Some or all of the discussion above regarding connection latency table 1300 may be applicable to connection latency table 1400. However, connection latency table 1400 includes different connection score measurements as shown at column 1410. Returning to the example of the www.foo.com domain, rows 1402-1406 are each associated with a synthetic latency or connection score of −1, indicating a measurement failure and/or a lack of connectivity to content server 108 through the associated path. The content server 108 is accessible through the LHR POP. As such, the highest ranking dynamic path is through the SFO entry POP and the LHR exit POP because the 150 millisecond synthetic latency is a higher connection quality than the lack of connectivity indicated by the −1 connection scores. Although performance through the LHR POP is degraded in terms of connection quality (e.g., 150 millisecond synthetic latency), the content server 108 remains accessible. The content server 108 would have been inaccessible to the mobile device 102 under the conditions shown in FIG. 14 and without the mobile accelerator system 104, such as shown by row 1402 indicating that the direct connection is unavailable. Although three POPs 110 are discussed in this example, it is appreciated that additional POPs can further enhance the outage-resistant network architecture.

At 510-514, data transfers between the mobile device 102 and the content server 108 may be routed based on the dynamic path ranking. At 510, the entry POP 110a may be configured to determine whether the direct connection score is the highest ranked of the dynamic path ranking. With reference to of the latency table 1300, the direct connection score of 100 milliseconds shown at row 1302 is lower ranked than at least one POP connection score, such as the POP connection scores in rows 1304 and 1306. As such, the direct connection score is not the highest ranked of the dynamic path ranking. Depending on relative locations and/or other factors, the direct connection score may be higher ranked than any of the dynamic path rankings, such as when the mobile device 102 is nearer or otherwise has a higher quality connection to the content server 108 than any POP 110 of the mobile accelerator system 104.

In response to determining that the direct connection score is the highest ranked, method 500 may proceed to 512, where the entry POP 110a may be configured to route data transfers between the mobile device and the content server through the direct connection. For example, the content router module (e.g., of the entry POP 110a) may return an instruction to the mobile device 102 to route data transfers directly to the content server 102 without traversing any POP 110 of the mobile accelerator network 104.

Returning to 510, in response to determining that the direct connection fails to be the highest ranked of the dynamic path ranking, method 500 may proceed to 514, where the entry POP 110a may be configured to route data transfers between the mobile device 102 and the content server 108 through the entry POP 110a and a highest ranked exit POP. The highest ranked exit POP may be the same POP as entry POP 110a, or alternatively, may be different POP 110 of the mobile accelerator system 104.

The POP connection score associated with using a single entry/exit POP is analogous to a direct connection score because the single entry/exit POP is used for a direct connection to the content server 108. With reference to of the latency table 1300, the connection score of 80 milliseconds shown at row 1304 is lower ranked than the POP connection score of 50 milliseconds at row 1306. As such, the connection score associated with using the SFO POP as the single entry/exit POP is not the highest ranked of the dynamic path ranking. Depending on relative locations and/or other factors, the connection score using the single entry/exit POP may be higher ranked than any of the other dynamic path rankings (e.g., using a separate exit POP) when the entry POP 110a is nearer or otherwise has a higher quality connection to the content server 108 than any other POP 110 of the mobile accelerator system 104.

In response to determining that using the entry/exit POP is associated with the highest POP connection score, the entry POP 110a may be configured to route data transfers between the mobile device 102 and the content server 108 through the single entry/exit POP. Here, the data transfers are not routed through any of the other POPs 110 of the mobile accelerator system 104.

In response to determining that a different POP 110 from entry POP 110a is the highest ranking exit POP associated with the highest POP connection score, the entry POP 110a may be configured to route data transfers between the mobile device 102 and the content server 104 through the entry POP 110a and the highest ranked exit POP 110b. With reference to of the latency table 1300, the highest POP connection score as shown in column 1314 is in row 1306, where the SFO POP 110 is the entry POP 110a and the NRT is the exit POP 110b. As such, the entry POP 110a may be configured to route data transfers through the SFK entry POP 110a and the highest ranked NRT exit POP 110b. At the exit POP 110b, the content router module may then route the data transfers to the content server 108.

FIG. 10 shows an example of data transfer reporter interface 1000 in accordance with some embodiments. The data transfer reporter interface 1000 may be presented on the mobile device 102 in response to user selection of the data transfer reporter button 626 in mobile acceleration overview display 604. Data transfer reporter interface 1000 may be configured to provide a reporting of cumulative data transferred through the mobile accelerator system 104. For example, each content provider 1002 (e.g., domain name such as www.foo.com) and the associated download and upload amounts 1004 may be tracked and presented within the data transfer reporter interface 1000. Method 500 may then proceed to 516 and end.

CONCLUSION

Many modifications and other embodiments will come to mind to one skilled in the art to which these embodiments pertain having the benefit of the teachings presented in the foregoing descriptions and the associated drawings. For example, while techniques for mobile device acceleration are discussed herein as being performed over the Internet, they may also be applicable to data delivery acceleration on other wide area networks and/or other (e.g., stationary, wired communication) devices. Therefore, it is to be understood that embodiments and implementations are not to be limited to the specific examples disclosed and that modifications and other embodiments are intended to be included within the scope of the appended claims.

That which is claimed:

1. A system, comprising:
a mobile device configured to:
determine an entry point of presence (POP) from POPs of a mobile accelerator system; and
create a dedicated transport channel with the entry POP; and
the mobile accelerator system including the POPs, wherein the entry POP is configured to:
receive a query to a content server from the mobile device via the dedicated transport channel;
determine at least a portion a dynamic path between the mobile device and the content server by:
determining a direct connection score for a direct connection between the mobile device and the content server without traversing the mobile accelerator system;
determining a POP connection score for a connection between the mobile device and the content server through the entry POP and a candidate exit POP of the plurality of POPs;
determining a dynamic path ranking based on the direct connection score, the POP connection score, and one or more other POP connection scores associated with one or more other candidate exit POPs of the mobile accelerator system; and
determining the at least a portion of the dynamic path based on the dynamic path ranking; and
route data transfers between the mobile device and the content server through the at least a portion of the dynamic path.

2. The system of claim 1, wherein the entry POP configured to determine the direct connection score includes the entry POP being configured to determine a synthetic latency between the mobile device and the content server without traversing the mobile accelerator system.

3. The system of claim 1, wherein the entry POP configured to determine the POP connection score includes the entry POP being configured to determine a synthetic latency between the entry POP and the content server without traversing a next POP of the mobile accelerator system.

4. The system of claim 1, wherein the entry POP configured to determine the POP connection score includes the entry POP being configured to determine a POP-to-POP score based on a synthetic latency between the entry POP and the candidate exit POP.

5. The system of claim 1, wherein the entry POP configured to determine the POP connection score includes the entry POP being configured to determine an exit POP score based on a synthetic latency between an exit POP of the mobile accelerator system and the content server.

6. The system of claim 1, wherein the entry POP configured to route the data transfers through the at least a portion of the dynamic path includes the entry POP being configured to route the data transfers through an exit POP of the mobile accelerator system.

7. The system of claim 1, wherein the entry POP configured to route the data transfers through the at least a portion of the dynamic path includes the entry POP being configured to route the data transfers through the entry POP as a single entry/exit POP.

8. The system of claim 1, wherein at least one of the mobile device or the entry POP is further configured to:
determine a static path between the mobile device and a second content server via a static POP of the mobile accelerator system; and
route the data transfers between the mobile device and the second content server through the static POP.

9. The system of claim 1, wherein the mobile device configured to determine the entry POP includes the mobile device being configured to determine an entry POP score for the entry POP based on a synthetic latency between the mobile device and entry POP.

10. The system of claim 1, wherein the entry POP configured to determine the at least a portion of the dynamic path includes the entry POP being configured to determine a POP-to-POP score between the entry POP and an exit POP based on a synthetic latency between the entry POP and the exit POP.

11. The system of claim 1, wherein:
at least one of the mobile device and the entry POP is further configured to optimize the dedicated transport channel based on one or more of:
data encryption;
data compression;
transmission control protocol (TCP) optimization;
hypertext transfer protocol (HTTP) optimization user datagram protocol (UDP) optimization;
transport layer security (TLS) optimization;
connection pooling;
or HTTP keep-alive; and
the entry POP is further configured to optimize the at least a portion of the dynamic path between the entry POP and an exit POP of the mobile accelerator system based on one or more of:

data encryption;
data compression;
transmission control protocol (TCP) optimization;
hypertext transfer protocol (HTTP) optimization;
user datagram protocol (UDP) optimization;
or transport layer security (TLS) optimization;
connection pooling; or
HTTP keep-alive.

12. The system of claim 1, wherein the mobile device is further configured to generate the query to the content server in connection with executing an application.

13. The system of claim 1, wherein the entry POP configured to determine the at least a portion the dynamic path between the mobile device and the content server includes the entry POP being configured to:
  determine that a first path to the content server is unavailable; and
  in response to determining that the first path is unavailable, determine the at least a portion the dynamic path as a second path through at least one POP of the mobile accelerator system from which the content server is available.

14. The system of claim 1, wherein
  the entry POP configured to determine the at least a portion the dynamic path between the mobile device and the content server includes the entry POP being configured to determine a second POP from the POPs of the mobile accelerator system;
  the entry POP configured to route data transfers between the mobile device and the content server through the at least a portion the dynamic path includes the entry POP being configured to route the data transfers to the second POP; and
  the system further includes the second POP configured to route the data transfers to at least one of a third POP of the mobile accelerator system or the content server.

15. The system of claim 1, wherein the entry POP is a second mobile device.

16. A method of providing mobile device content delivery acceleration, comprising:
  determining, by a mobile device, an entry point of presence (POP) from POPs of a mobile accelerator system;
  creating, by the mobile device, a dedicated transport channel with the entry POP;
  receiving, by the entry POP, a query to the content server from the mobile device via the dedicated transport channel;
  determining, by the entry POP, at least a portion of a dynamic path between the mobile device and the content server by:
    determining a direct connection score for a direct connection to between the mobile device and the content server without traversing the mobile accelerator system;
    determining a POP connection score for a connection between the mobile device and the content server through the entry POP and a candidate exit POP of the plurality of POPs;
    determining a dynamic path ranking based on the direct connection score, the POP connection score, and one or more other POP connection scores associated with one or more other candidate exit POPs of the mobile accelerator system; and
    determining the at least a portion of the dynamic path based on the dynamic path ranking; and
  routing, by the entry POP, data transfers between the mobile device and the content server through the at least a portion of the dynamic path.

17. The method of claim 16, wherein determining the direct connection score includes determining a synthetic latency between the mobile device and the content server without traversing the mobile accelerator system.

18. The method of claim 16, wherein determining the POP connection score includes determining a synthetic latency between the entry POP and the content server without traversing a next POP of the mobile accelerator system.

19. The method of claim 16, wherein determining the POP connection score includes determining a POP-to-POP score based on a synthetic latency between the entry POP and the candidate exit POP.

20. The method of claim 16, wherein determining the POP connection score includes determining an exit POP score based on a synthetic latency between an exit POP of the mobile accelerator system and the content server.

21. The method of claim 16, wherein routing the data transfers through the at least a portion of the dynamic path includes routing the data transfers through an exit POP of the mobile accelerator system.

22. The method of claim 16, wherein routing the data transfers through the at least a portion of the dynamic path includes routing the data transfers through the entry POP as a single entry/exit POP.

23. The method of claim 16 further comprising, by at least one of the mobile device or the entry POP:
  determining a static path between the mobile device and a second content server via a static POP of the mobile accelerator system; and
  routing second data transfers between the mobile device and the second content server through the static POP.

24. The method of claim 16, wherein determining the entry POP includes determining an entry POP score for the entry POP based on a synthetic latency between the mobile device and entry POP.

25. The method of claim 16 further comprising:
  optimizing, by at least one of the mobile device and the entry POP, the dedicated transport channel based on one or more of:
    data encryption;
    data compression;
    transmission control protocol (TCP) optimization;
    hypertext transfer protocol (HTTP) optimization user datagram protocol (UDP) optimization;
    transport layer security (TLS) optimization;
    connection pooling;
    or HTTP keep-alive; and
  optimizing, by the entry POP, the at least a portion of the dynamic path between the entry POP and an exit POP of the mobile accelerator system based on one or more of:
    data encryption;
    data compression;
    transmission control protocol (TCP) optimization;
    hypertext transfer protocol (HTTP) optimization;
    user datagram protocol (UDP) optimization;
    transport layer security (TLS) optimization;
    connection pooling; or
    HTTP keep-alive.

26. The method of claim 16, wherein determining the at least a portion of the dynamic path includes determining a POP-to-POP score between the entry POP and an exit POP based on a synthetic latency between the entry POP and the exit POP.

27. The method of claim 16 further comprising generating, by the mobile device, the query to the content sever in connection with executing an application.

28. The method of claim 16, wherein determining the at least a portion the dynamic path between the mobile device and the content server includes:
  determining that a first path to the content server is unavailable; and in response to determining that the first path is unavailable, determining the at least a portion the dynamic path as a second path through at least one POP of the mobile accelerator system from which the content server is available.

29. The method of claim 16, wherein:
determining the at least a portion the dynamic path between the mobile device and the content server includes determining a second POP from the POPs of the mobile accelerator system;
routing data transfers between the mobile device and the content server through the at least a portion the dynamic path includes routing the data transfers to the second POP; and
the method further includes routing, by the second POP, the data transfers to at least one of a third POP of the mobile accelerator system or the content server.

30. The method of claim 16, wherein the entry POP is a second mobile device.

31. A mobile device, comprising:
processing circuitry configured to:
    determine an entry POP from POPs of a mobile accelerator system;
    determine a query to a content server;
    determine at least a portion a dynamic path to the content server, wherein the portion of the dynamic path includes either (a) the entry POP or (b) a direct connection to the content server without including the POPS of the mobile accelerator system, wherein the circuitry configured to determine the at least a portion of the dynamic path includes the circuitry being configured to:
        determine a first synthetic latency between the mobile device and the content server via the entry POP;
        determine a second synthetic latency between the mobile device and the content server via the direct connection; and
        determine the at least a portion of the dynamic path based at least in part on the first synthetic latency and the second synthetic latency; and
    route data transfers between the mobile device and the content server through the at least a portion of the dynamic path.

32. The mobile device of claim 31, wherein the processing circuitry configured to determine the query to the content server includes the processing circuitry being configured to receive the query from at least one of a second mobile device or a second POP of the mobile accelerator system.

33. The mobile device of claim 31, wherein the processing circuitry configured to determine the query to the content server includes the processing circuitry being configured to receive the query from an application executing on the mobile device.

34. The mobile device of claim 31, wherein the entry POP of the mobile accelerator system is a second mobile device.

* * * * *